US009180844B2

(12) United States Patent
Murata et al.

(10) Patent No.: US 9,180,844 B2
(45) Date of Patent: Nov. 10, 2015

(54) ELECTRIC PARKING BRAKE CONTROL DEVICE

(71) Applicant: ADVICS CO., LTD., Kariya (JP)

(72) Inventors: Shunsuke Murata, Ama-gun (JP); Masatoshi Hanzawa, Kariya (JP); Tsuyoshi Ando, Toyota (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 169 days.

(21) Appl. No.: 13/847,240

(22) Filed: Mar. 19, 2013

(65) Prior Publication Data

US 2013/0275019 A1 Oct. 17, 2013

(30) Foreign Application Priority Data

Mar. 22, 2012 (JP) .................................. 2012-065545
Sep. 28, 2012 (JP) .................................. 2012-217077

(51) Int. Cl.
*B60T 7/12* (2006.01)
*B60T 7/22* (2006.01)
*B60T 13/74* (2006.01)

(52) U.S. Cl.
CPC ... *B60T 7/12* (2013.01); *B60T 7/22* (2013.01); *B60T 13/741* (2013.01)

(58) Field of Classification Search
CPC ........... B60T 7/12; B60T 7/122; B60T 7/203; B60T 13/10; B60T 13/142; B60T 13/74; B60T 13/741; B60W 10/184; B60W 10/188; B60W 10/18
USPC ..................................................... 701/70, 78
See application file for complete search history.

(56) References Cited

U.S. PATENT DOCUMENTS

| 3,882,959 | A | * | 5/1975 | Hsieh ............................. 180/287 |
| 4,572,319 | A | * | 2/1986 | Fontaine ........................ 180/273 |
| 5,366,053 | A | * | 11/1994 | Yant ............................ 192/219.2 |
| 6,260,934 | B1 | * | 7/2001 | Lee ................................. 303/192 |
| 6,913,121 | B2 | * | 7/2005 | Park .............................. 188/156 |
| 7,908,071 | B2 | | 3/2011 | Nakayama |
| 2004/0144600 | A1 | * | 7/2004 | Ikegami et al. ................ 188/2 F |
| 2004/0226768 | A1 | * | 11/2004 | DeLuca et al. ................ 180/275 |
| 2005/0200196 | A1 | * | 9/2005 | Fulks et al. ................. 303/115.1 |
| 2005/0212355 | A1 | * | 9/2005 | Godlewsky et al. ............ 303/20 |
| 2009/0026835 | A1 | * | 1/2009 | Matsubara et al. ............. 303/15 |
| 2011/0153147 | A1 | * | 6/2011 | Watanabe et al. ............... 701/29 |
| 2011/0278107 | A1 | * | 11/2011 | Kim .............................. 188/72.1 |
| 2012/0187750 | A1 | * | 7/2012 | Kish et al. ....................... 303/10 |

FOREIGN PATENT DOCUMENTS

JP 2008-094142 A 4/2008

* cited by examiner

*Primary Examiner* — Russell Frejd
*Assistant Examiner* — Sara Nelson
(74) *Attorney, Agent, or Firm* — Buchanan Ingersoll & Rooney PC

(57) ABSTRACT

An EPB control device controlling an electric actuator driving an EPB, wherein the device performs control to reach a lock position, a release position and a standby position between the lock position and the release position. In the lock position, a friction-applying member is thereby pressed against a friction-applied member by the EPB by actuating the electric actuator and a predetermined braking force is generated. In the release position, the friction-applying member is separated from the friction-applied member when the EPB is not actuated. In the standby position, a transition to the lock position is performed in a shorter time than when the EPB is actuated from the release position by the actuation of the electric actuator. The device controls, when a starting operation to start moving a vehicle is performed, the electric actuator such that the standby position is reached.

17 Claims, 27 Drawing Sheets

ELECTRIC PARKING BRAKE CONTROL DEVICE

TECHNICAL FIELD

The present invention relates to an electric parking brake control device that controls an electric parking brake (hereinafter referred to as an EPB) and thereby inhibits rolling back of a vehicle when the vehicle starts to move on a slope.

BACKGROUND ART

In related art, Patent Literature 1 proposes an EPB control device that can secure vehicle safety when stalling of an engine (hereinafter referred to as an engine stall) occurs when a manual transmission vehicle provided with an EPB starts to move on a slope. The EPB control device detects the engine stall, and inhibits the vehicle from rolling back downward with respect to the slope by actuating the EPB when the engine stall is detected.

CITATION LIST

Patent Literature

[PTL 1]
Japanese Patent Application Publication No. JP-A-2008-094142

SUMMARY OF INVENTION

Technical Problem

However, in the EPB control device described in the above-described Patent Literature 1, control that causes a wheel to be in a locked state (hereinafter referred to as lock control) is performed by actuating the EPB from a normal EPB released state, namely, a released state. Therefore, it takes time from when the engine stall is detected to when a braking force is generated. More specifically, brake pads are moved from the normal EPB released state in which the brake pads are separated from a brake disc, and are pressed against the brake disc, thereby generating a braking force for the wheel. Therefore, it takes time until this state is reached. As a result, there is a possibility that the vehicle may roll back on a slope. An engine stall is particularly likely to occur on a slope because an accelerator is not sufficiently depressed, and there are cases in which the vehicle rolls back significantly on a steep slope.

Note that the situation in which the vehicle rolls back at the time of starting to move is not limited to a case in which the vehicle is intended to move forward on an uphill slope, and also occurs when the vehicle is intended to move rearward on a downhill slope.

In light of the foregoing, it is an object of the present invention to provide an EPB control device that can inhibit rolling back of a vehicle when an engine stall occurs when the vehicle starts to move on a slope.

Solution to Problem

In order to achieve the above-described object, according to a first aspect of the invention, an EPB control device that controls an electric actuator that drives an EPB, wherein the EPB control device performs control to reach a lock position, a release position and a standby position between the lock position and the release position, wherein: in the lock position, the electric actuator is actuated, a friction-applying member is thereby pressed against a friction-applied member by the EPB by actuating the electric actuator, and a predetermined braking force is generated; in the release position, the friction-applying member is separated from the friction-applied member when the EPB is not actuated; and in the standby position, a transition to the lock position is performed in a shorter time than when the EPB is actuated from the release position by the actuation of the electric actuator, and the EPB control device controls, when a starting operation to start moving a vehicle is performed, the electric actuator such that the standby position is reached.

In this manner, when the starting operation of the vehicle is performed, the standby position is reached, in which the transition to the lock position is performed in a shorter time than in the release position, namely, the standby position in which the friction-applying member can be pressed against the friction-applied member, in a shorter time. Thus, it is possible to generate a parking brake force more quickly at the time of an engine stall, and it is possible to inhibit rolling back of the vehicle.

For example, in a second aspect of the invention, it is preferable that accelerator release control for controlling the electric actuator to reach the standby position is performed when the starting operation is performed while in lock control or in a locked state, wherein the lock control is such that the actuator is controlled toward the lock position and that the lock position is to be held after the lock position is reached, and the lock state is such that the lock position is continued to be held.

In a third aspect of the invention, it is determined whether normal starting is performed in which a transition to traveling is performed after the vehicle is started by the starting operation or whether there is a start failure in which the transition to traveling cannot be performed. When the normal starting is performed, the electric actuator is controlled such that the release position is reached, and when the start failure occurs, the electric actuator is controlled such that the lock position is reached.

In this manner, the release position is reached when the normal starting is performed in which the transition to traveling is performed without an engine stall occurring, and the lock position is reached when the start failure occurs in which the transition to traveling cannot be performed. Thus, it is possible to generate a parking brake force and it is possible to inhibit rolling back of the vehicle.

For example, in a fourth aspect of the invention, the invention described in any one of first to fourth aspects can be realized by a structure that includes: lock control means for performing the lock control; release control means for controlling the electric actuator such that the release position is reached; starting state determination means for determining whether the normal starting is performed; accelerator release control determination means for determining whether the starting operation is performed when the lock control is being performed or when in the locked state; accelerator release control means for controlling the electric actuator such that the standby position is reached when the accelerator release control determination means determines that the starting operation is performed; standby cancellation release control means for controlling the electric actuator such that the release position is reached from the standby position when the starting state determination means determines that the normal starting is performed; and start failure lock control means for controlling the electric actuator such that the lock position is reached when the starting state determination means determines that the start failure has occurred.

A fifth aspect of the invention is characterized by including: starting state determination means for determining that normal starting is performed when a transition to traveling is performed after a vehicle has started moving, and for determining that a start failure occurs when the transition to traveling cannot be performed; accelerator release control determination means for determining whether a starting operation is performed when the lock control is being performed or when in the locked state; accelerator release control means for moving the propeller shaft to a standby position when the accelerator release control determination means determines that the starting operation is performed, the standby position being between a lock position where the locked state is established and a release position where the released state is established; standby cancellation release control means for performing the release control and moving the propeller shaft from the standby position to the release position when the starting state determination means determines that the normal starting is performed; and start failure lock control means for performing start failure lock control when the starting state determination means determines that the start failure has occurred, and for generating a parking brake force by causing the propeller shaft to move in one direction by driving the motor to rotate in the positive direction.

In this manner, when the vehicle is stopped on a slope, the standby position of the propeller shaft is set to be closer to the lock position than the release position, namely to the standby position where the friction-applying member can be pressed against the friction-applied member in a shorter time. Thus, it is possible to generate a parking brake force more quickly at the time of an engine stall, and it is possible to inhibit rolling back of the vehicle.

A sixth aspect of the invention is characterized in that the start failure lock control means performs the start failure lock control and thereby generates a parking brake force that is larger than that generated by the normal lock control.

In this manner, the parking brake force that is larger than that generated by the normal lock control is generated. Thus, it is possible to reliably stop the vehicle even in a situation in which the vehicle rolls back, namely, a situation that cannot be controlled by the driver, and it is possible to reliably stop the vehicle even when the braking force deteriorates due to shaking of the vehicle.

For example, a brake mechanism can be applied in which the EPB generates a parking brake force by causing the propeller shaft to move in the one direction and also causing a piston to move in the same direction such that the friction-applying member is pressed against the friction-applied member, and the piston generates a service brake force by pressing the friction-applying member against the friction-applied member based on a brake fluid pressure generated by an operation of a service brake.

In this case, for example, the accelerator release control means can cause the propeller shaft to move to a first standby position in which a clearance exists between the piston and the propeller shaft, as described in a seventh aspect of the invention, or can cause the propeller shaft to move to a second standby position in which the propeller shaft is in contact with the piston and the piston has been moved in the one direction from an initial position when in the released state, as an eighth aspect of the invention In this manner, when the propeller shaft is moved to the first standby position, the propeller shaft is located closer to the piston. As a result, the response of the EPB can be improved and the parking brake force by the EPB can be generated more quickly. Therefore, the amount of rolling back of the vehicle can be reduced, and it is possible to inhibit the rolling back of the vehicle. When the propeller shaft is moved to the second standby position, the response of the EPB can be improved. In addition, if the driver senses the rolling back of the vehicle and suddenly operates the service brake, the response of the service brake can also be improved.

However, when the standby position is set to the second standby position, a brake dragging feeling may be caused or brake noise may occur. Therefore, in a ninth aspect of the invention, it is preferable that, as the standby position, the first standby position is selected when an inclination of a road surface on which the vehicle is stopped is equal to or less than a predetermined threshold value, and the second standby position is selected when the inclination exceeds the threshold value. By doing this, it is possible to select the standby position corresponding to the inclination of the road surface. Thus, it is possible to set the standby position depending on whether or not the situation requires the generation of the parking brake force more quickly even if a brake dragging feeling or brake noise occurs.

A tenth aspect of the invention is characterized in that the starting state determination means determines that there is the start failure when a driving force of the vehicle is less than a driving threshold value. Further, an eleventh aspect of the invention is characterized in that the starting state determination means determines that there is the start failure when a clutch operation amount of the vehicle is equal to or less than a reference value. As in these cases, the start failure can be determined based on the driving force of the vehicle or the clutch operation amount, for example. Further, a twelfth aspect of the invention is characterized in that the starting state determination means determines that the normal starting is performed when a speed of the vehicle (vehicle speed) reaches a certain value. In this manner, it is possible to determine the normal starting based on the vehicle speed.

Further, a thirteenth aspect of the invention is characterized in that the accelerator release control means determines whether a condition under which there is a possibility of an engine stall of the vehicle is satisfied, and the accelerator release control is performed when the condition is satisfied.

In this manner, the accelerator release control may be performed when the condition in which there is a possibility of occurrence of an engine stall is satisfied. Examples of such a condition include a case in which a driver's foot has been transferred to the accelerator pedal or a case in which the clutch is intended to be engaged.

A fourteenth aspect of the invention is characterized by further including release priority state determination means for determining whether a release priority state, in which priority is given to movement to the release position, is established. The accelerator release control is not performed when in the release priority state, the accelerator release control controlling the electric actuator such that the standby position is reached when it is determined that the starting operation is performed.

In this manner, when in the release priority state, the released state is established and not the accelerator standby state. By doing this, it is possible to reliably avoid excessive contact of the friction-applying member with the friction-applied member due to variation of the standby position or the like, and it is possible to suppress brake noise or vibration, and further, brake dragging from occurring.

For example, in a fifteenth aspect of the invention, when the vehicle is on a flat road, the release priority state determination means can determine that the release priority state is established, because in this situation, there is no need to improve the response of the EPB at the time of an engine stall and priority should be given to the suppression of brake noise or vibration and of brake dragging. Further, in a sixteenth aspect of the invention, when the vehicle is on a low μ road whose road surface friction coefficient μ is lower than a predetermined threshold value, the release priority state determination means can determine that the release priority state is established, because there is a possibility that the wheel speed may be reduced due to brake dragging, rear wheels may be locked, or the stability of the vehicle may deteriorate as a result of a braking force difference due to a dragging level variation between the left and right wheels. Further, in a seventeenth aspect of the invention, the release priority state determination means may have obstacle detection means for detecting an obstacle in the vicinity of the vehicle. When a distance between the vehicle and the detected obstacle is equal to or more than a predetermined distance, the release priority state can be determined, because in this situation, a problem does not occur even if the vehicle rolls back and priority should be given to the suppression of brake noise or vibration and of brake dragging.

Note that the reference numeral in brackets of each means described above shows an example of a corresponding relationship with specific means explained in embodiments described later.

DESCRIPTION OF EMBODIMENTS

Figure 1:
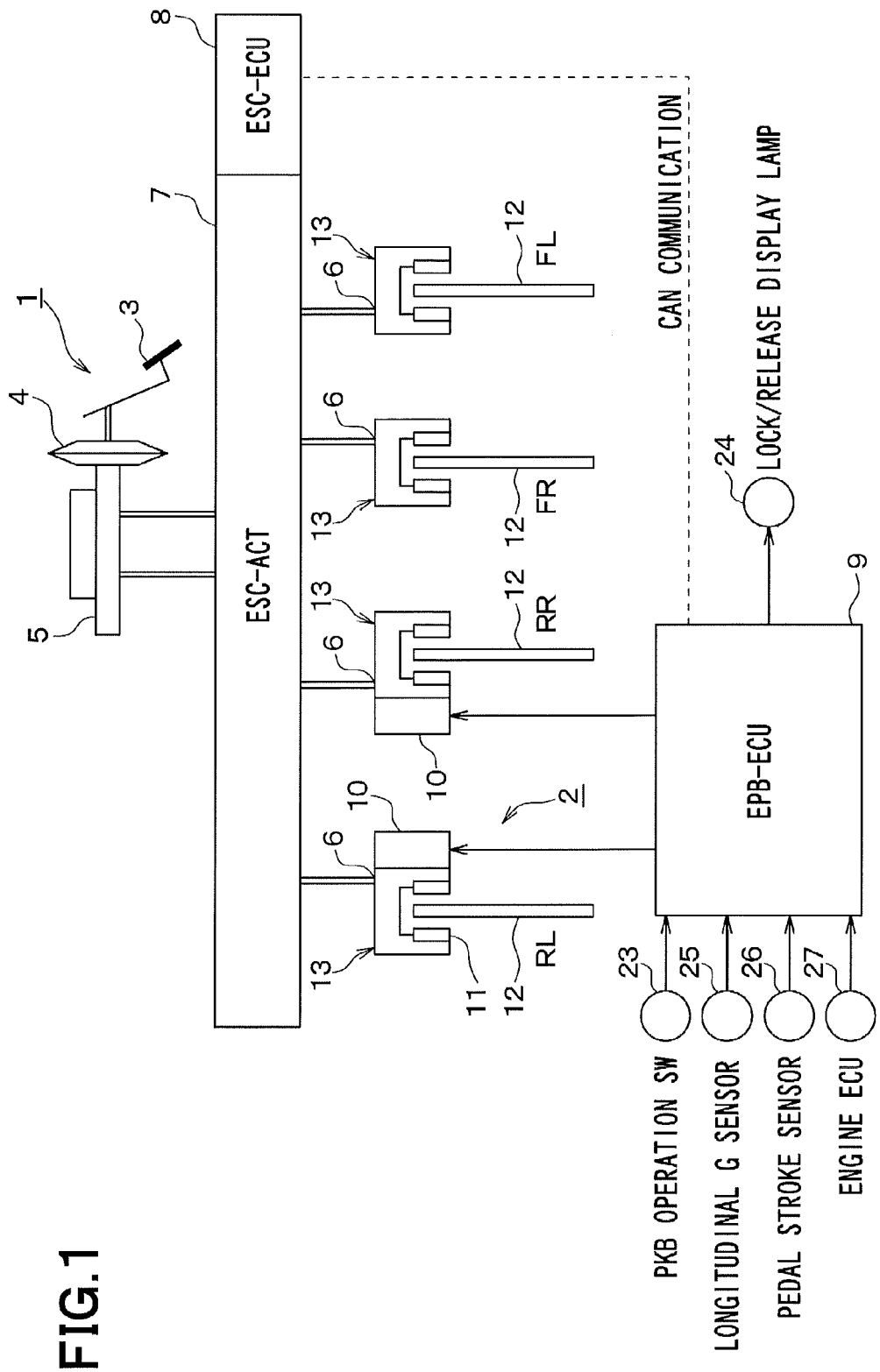
FIG. 1 is a schematic diagram showing an overall outline of a vehicle brake system to which an EPB control device according to a first embodiment of the present invention is applie

Hereinafter, embodiments of the present invention will be explained with reference to the drawings. Note that, in the respective embodiments below, portions that are the same or equivalent to each other are explained by assigning the same reference numerals thereto.

(First embodiment)

Figure 2:
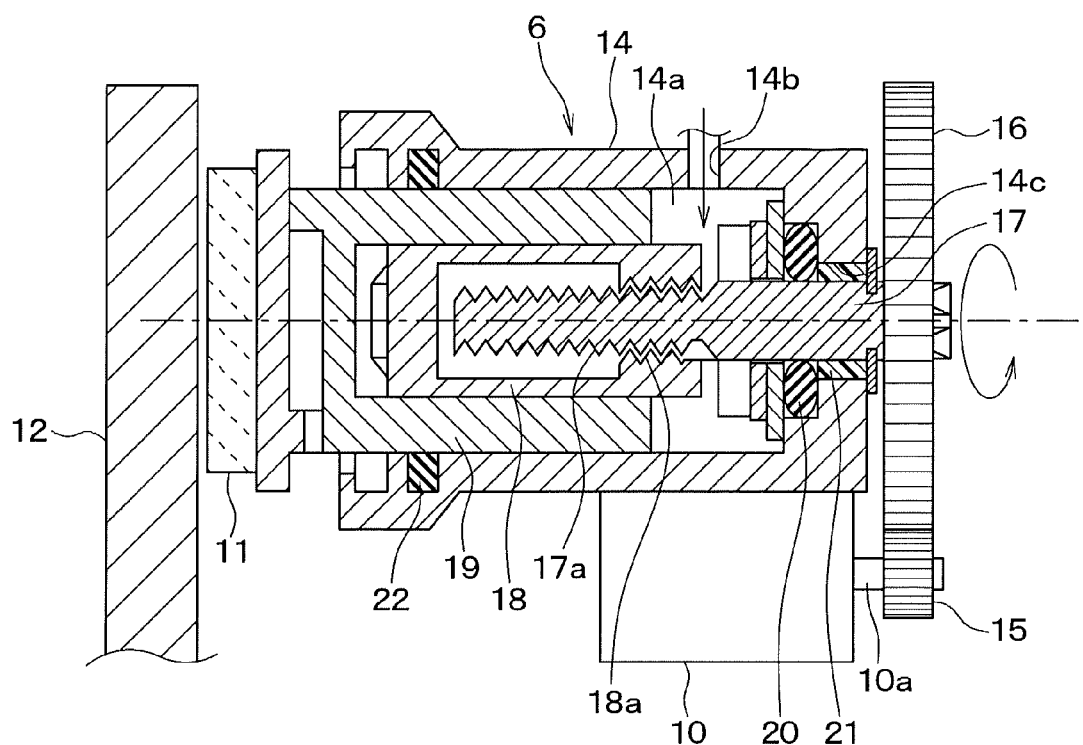
FIG. 2 is a cross-sectional schematic diagram of a rear wheel brake mechanism that is provided in the brake system.

A first embodiment of the present invention will be explained. In the present embodiment, a vehicle brake system in which a disc brake type EPB is applied to a rear wheel system will be explained as an example. FIG. 1 is a schematic diagram showing an overall outline of the vehicle brake system to which an EPB control device according to the present embodiment is applied. FIG. 2 is a cross-sectional schematic diagram of a rear wheel brake mechanism that is provided in the brake system. These figures will be referred to in the following explanation.

As shown in FIG. 1, the brake system is provided with a service brake 1 that generates a service brake force based on a pedal depression force by a driver, and an EPB 2 that restricts movement of a vehicle at the time of parking or the like.

The service brake 1 boosts the pedal depression force that corresponds to depression of a brake pedal 3 by the driver, using a servo unit 4. After that, a brake fluid pressure corresponding to the boosted pedal depression force is generated in a master cylinder (hereinafter referred to as an M/C) 5, and the brake fluid pressure is transmitted to a wheel cylinder (hereinafter referred to as a W/C) 6 that is provided in a brake mechanism of each wheel, thereby generating the service brake force. Further, an actuator 7 for brake fluid pressure control is provided between the M/C 5 and the W/C 6, and the service brake force generated by the service brake 1 is adjusted, thereby achieving a structure in which various types of control (for example, anti-lock control etc) can be performed to improve vehicle safety.

The various types of control using the actuator 7 are performed by an electronic stability control (ESC)-ECU 8. For example, the ESC-ECU 8 outputs a control current for controlling various types of control valves and a pump drive motor that are not shown in the drawings and that are provided in the actuator 7. The ESC-ECU 8 thereby controls a hydraulic circuit provided in the actuator 7, and controls a W/C pressure that is transmitted to the W/C 6. As a result, wheel slip is avoided and the safety of the vehicle is improved. For example, the actuator 7 includes, for each wheel, a pressure increase control valve and a pressure decrease control valve etc., and the W/C pressure can be controlled to be increased, maintained or reduced. The pressure increase control valve controls application to the W/C 6 of either the brake fluid pressure generated in the M/C 5 or the brake fluid pressure generated by pump drive. The pressure decrease control valve reduces the W/C pressure by supplying the brake fluid in each of the W/Cs 6 to a reservoir. Further, the actuator 7 can realize an automatic pressurization function of the service brake 1 such that the W/C 6 can be automatically pressurized based on the control of the pump drive and the various types of control valves even when there is no brake operation. The structure of the actuator 7 is a known structure, and a detailed explanation thereof is therefore omitted here.

Meanwhile, the EPB 2 generates a parking brake force by controlling the brake mechanism using motors 10 that correspond to electric actuators, and thereby generates the parking brake force. The EPB 2 is configured such that it includes an EPB control device (hereinafter referred to as an EPB-ECU) 9 that controls the driving of the motors 10.

The brake mechanism is a mechanical structure that generates a brake force in the brake system of the present embodiment. A front wheel brake mechanism is a structure that generates a service brake force by an operation of the service brake 1. Meanwhile, the rear wheel brake mechanism is a dual-operation structure that generates a brake force in response to both the operation of the service brake 1 and the operation of the EPB 2. The front wheel brake mechanism is a generally used known brake mechanism, and does not include the mechanism that generates a brake force based on the operation of the EPB 2, unlike the rear wheel brake mechanism. Therefore, an explanation thereof is omitted here, and the rear wheel brake mechanism will be explained below.

Not only when the service brake 1 is actuated but also when the EPB 2 is actuated, the rear wheel brake mechanism presses a brake pad 11, which is a friction-applying member shown in FIG. 2, and a brake disc 12, which is a friction-applied member, is sandwiched by the brake pads 11. Thus, a frictional force is generated between the brake pads 11 and the brake disc 12 and the brake force is generated.

Specifically, in a caliper 13 shown in FIG. 1, the brake mechanism rotates the motor 10 that is directly fixed to a body 14 of the W/C 6 for pressing the brake pads 11, as shown in FIG. 2, and thereby rotates a spur gear 15 that is provided on a drive shaft 10a of the motor 10. Then, the brake mechanism transmits the torque of the motor 10 to a spur gear 16 that is meshed with the spur gear 15, and thereby moves the brake pads 11. Thus, the parking brake force of the EPB 2 is generated.

In the caliper 13, in addition to the W/C 6 and the brake pads 11, a part of an end face of the brake disc 12 is housed such that it is sandwiched between the brake pads 11. The W/C 6 is configured such that when brake fluid pressure is supplied to a hollow section 14a of the cylinder shaped body 14 through a passage 14b, W/C pressure is generated inside the hollow section 14a that is a brake fluid chamber. The W/C 6 is configured to include, in the hollow section 14a, a rotation shaft 17, a propeller shaft 18, a piston 19 and so on.

An end of the rotation shaft 17 is connected to the spur gear 16 through an insertion hole 14c that is formed in the body 14. When the spur gear 16 is rotated, the rotation shaft 17 is rotated along with the rotation of the spur gear 16. A male screw groove 17a is formed in an outer peripheral surface of the rotation shaft 17 at an end of the rotation shaft 17 that is on the opposite side to the end connected to the spur gear 16. Meanwhile, the other end of the rotation shaft 17 is inserted into the insertion hole 14c, and is thereby supported axially. More specifically, the insertion hole 14c is provided with an O-ring 20 and a bearing 21. The O-ring 20 prevents the brake fluid from leaking through between the rotation shaft 17 and an inner wall surface of the insertion hole 14c, while the bearing 21 axially supports the other end of the rotation shaft 17.

The propeller shaft 18 is a nut that is a hollow tubular member, and a female screw groove 18a that is engaged with the male screw groove 17a of the rotation shaft 17 is formed in an inner wall surface of the propeller shaft 18. For example, the propeller shaft 18 has a column shape or a polygonal column shape and is provided with an anti-rotation key, so that the propeller shaft 18 does not rotate around the rotation center of the rotation shaft 17 when the rotation shaft 17 rotates. Therefore, when the rotation shaft 17 is rotated, the meshing between the male screw groove 17a and the female screw groove 18a converts the torque of the rotation shaft 17 to a force that moves the propeller shaft 18 in the axial direction of the rotation shaft 17. When the drive of the motor 10 is stopped, the propeller shaft 18 stops at the same position due to the frictional force generated by the meshing between the male screw groove 17a and the female screw groove 18a. If the drive of the motor 10 is stopped when a target brake force is reached, the propeller shaft 18 can be held in that position.

The piston 19 is arranged to surround an outer periphery of the propeller shaft 18, and is formed by a bottomed cylindrical member or a bottomed polygonal cylindrical member. An outer peripheral surface of the piston 19 abuts against an inner wall surface of the hollow section 14a formed in the body 14. In order to inhibit leakage of the brake fluid from between the outer peripheral surface of the piston 19 and an inner wall surface of the body 14, a seal member 22 is provided on the inner wall surface of the body 14. Thus, the W/C pressure can be applied to an end face of the piston 19. The seal member 22 is a member that is used to generate a reaction force to pull back the piston 19 when release control is performed after lock control. Since the seal member 22 is provided, basically, even if the brake pad 11 and the piston 19 are pressed into by the brake disc 12 that is inclined during rotation, it is possible to push them back to the brake disc 12 side and to maintain the brake disc 12 and the brake pad 11 such that they have a predetermined clearance therebetween.

Further, when the propeller shaft 18 is provided with the anti-rotation key in order to ensure that it does not rotate about the rotation center of the rotation shaft 17 when the rotation shaft 17 rotates, the piston 19 is provided with a key groove along which the anti-rotation key slidingly moves. If the propeller shaft 18 has a polygonal column shape, the piston 19 is formed in a polygonal cylinder shape that corresponds to that shape.

The brake pad 11 is provided at an end of the piston 19, and the brake pad 11 is moved in the left-right direction in the drawing along with the movement of the piston 19. More specifically, the piston 19 is configured such that it can move in the left direction in the drawing along with the movement of the propeller shaft 18, and also can move in the left direction in the drawing independently of the propeller shaft 18 when the W/C pressure is applied to an end of the piston 19 (an end that is on the opposite side to the end provided with the brake pad 11). If the brake fluid pressure in the hollow section 14a is not applied (W/C pressure=0) when the propeller shaft 18 is in a release position (a state before the motor 10 is rotated), which is a standby position when the propeller shaft 18 is in a normal released state, the piston 19 is moved in the right direction in the drawing by an elastic force of the seal member 22, which will be described later. The brake pad 11 is thereby moved away from the brake disc 12. If the W/C pressure becomes zero when the motor 10 is rotated and the propeller shaft 18 is moved from an initial position to the left in the drawing, the movement of the piston 19 in the right direction in the drawing is restricted by the moved propeller shaft 18, and the brake pad 11 is held at that position.

In the brake mechanism structured as described above, when the service brake 1 is operated, the W/C pressure generated by the operation of the service brake 1 causes the piston 19 to move in the left direction in the drawing. As a result, the brake pads 11 are pressed against the brake disc 12, and the service brake force is thereby generated. Further, when the EPB 2 is operated, the motor 10 is driven and the spur gear 15 is rotated. Along with this, the spur gear 16 and the rotation shaft 17 are rotated, and the meshing between the male screw groove 17a and the female screw 18a causes the propeller shaft 18 to move to the brake disc 12 side (in the left direction in the drawing). Then, along with this, the leading end of the propeller shaft 18 comes into contact with a bottom surface of the piston 19 and presses the piston 19, and the piston 19 is also moved in the same direction. Thus, the brake pads 11 are pressed against the brake disc 12, and a parking brake force is thereby generated. Thus, it is possible to achieve a dual-operation brake mechanism that generates a brake force in response to both the operation of the service brake 1 and the operation of the EPB 2.

Further, in this type of brake mechanism, if the EPB 2 is actuated when the W/C pressure is 0 and before the brake pads 11 are pressed against the brake disc 12, or even when the W/C pressure is generated by the actuation of the service brake 1, in a state before the propeller shaft 18 is in contact with the piston 19, the load on the propeller shaft 18 is reduced and the motor 10 is driven with almost no load. When the brake disc 12 is pressed by the brake pads 11 in a state in which the propeller shaft 18 is in contact with the piston 19, the parking brake force by the EPB 2 is generated, a load is applied to the motor 10, and the value of a motor current that flows to the motor 10 changes. Therefore, by confirming the motor current value, it is possible to confirm a generation state of the parking brake force by the EPB 2.

The EPB-ECU 9 is configured by a well-known microcomputer that is provided with a CPU, a ROM, a RAM, an I/O and the like, and performs parking brake control by controlling the rotation of the motor 10 in accordance with a program stored in the ROM or the like. The EPB-ECU 9 corresponds to an EPB control device of the present invention.

The EPB-ECU 9 receives a signal etc. in accordance with an operation state of an operation switch (SW) 23 that is provided on an instrument panel (not shown in the drawings) in a vehicle compartment, for example, and drives the motor 10 in accordance with the operation state of the operation SW 23. Further, the EPB-ECU 9 performs lock control, release control and the like based on the motor current value. Based on the control state, the EPB-ECU 9 ascertains that the lock control is being performed or the wheel is in a locked state by the lock control, and that the release control is being performed or the wheel is in a released state (an EPB released state) by the release control. Then, in accordance with the drive state of the motor 10, the EPB-ECU 9 outputs a signal indicating whether the wheel is in a locked state or a released state to a lock/release display lamp 24 that is provided on the instrument panel.

Note that the EPB-ECU 9 receives detection signals from a longitudinal acceleration sensor (hereinafter referred to as a longitudinal G sensor) 25 that detects acceleration in the front-rear direction of the vehicle and from a pedal stroke sensor 26 that detects a stroke of a clutch pedal not shown in the drawings, and various types of data from an engine ECU 27. Therefore, the EPB-ECU 9 can estimate an inclination (a gradient) of a road surface on which the vehicle is stopped using a known technique based on gravitational acceleration components contained in the detection signal from the longitudinal G sensor 25, can detect a clutch operation state based on the pedal stroke sensor 26, or can ascertain the driving force based on the data from the engine ECU 27.

In the vehicle brake system structured as described above, basically, an operation to generate a braking force for the vehicle is performed by generating a service brake force by the service brake 1 when the vehicle is travelling. Further, when the vehicle is stopped by the service brake 1, the vehicle stopped state is maintained if the driver depresses the operation SW 23 to actuate the EPB 2 and thereby generates a parking brake force, or thereafter an operation to release the parking brake force is performed. More specifically, the operation of the service brake 1 is such that, if a brake pedal operation is performed by the driver when the vehicle is travelling, the brake fluid pressure generated in the M/C 5 is transmitted to the W/C 6, thereby generating a service brake force. Meanwhile, the operation of the EPB 2 is such that the piston 19 is moved by driving the motor 10 and the parking brake force is generated by pressing the brake pads 11 against the brake disc 12, thereby causing the wheel to be locked, or the parking brake force is released by separating the brake pads 11 from the brake disc 12, thereby causing the wheel to be released.

Specifically, the parking brake force is generated or released by lock/release control. In the lock control, the EPB 2 is actuated by rotating the motor 10 in a positive direction, and the rotation of the motor 10 is stopped at a position where a desired parking brake force can be generated by the EPB 2. Then, this state is maintained. By doing this, the desired parking brake force is generated. In the release control, the EPB 2 is actuated by rotating the motor 10 in a reverse direction, and the parking brake force generated by the EPB 2 is released.

Then, in the present embodiment, further, the EPB 2 is used to inhibit rolling back of the vehicle at the time of an engine stall on a slope. Hereinafter, EPB control processing, which is performed in the vehicle brake system according to the present embodiment, will be explained in detail. Before explaining that, an operation that is performed by the EPB 2 to inhibit rolling back of the vehicle at the time of an engine stall on a slope will be explained.

Figure 3:
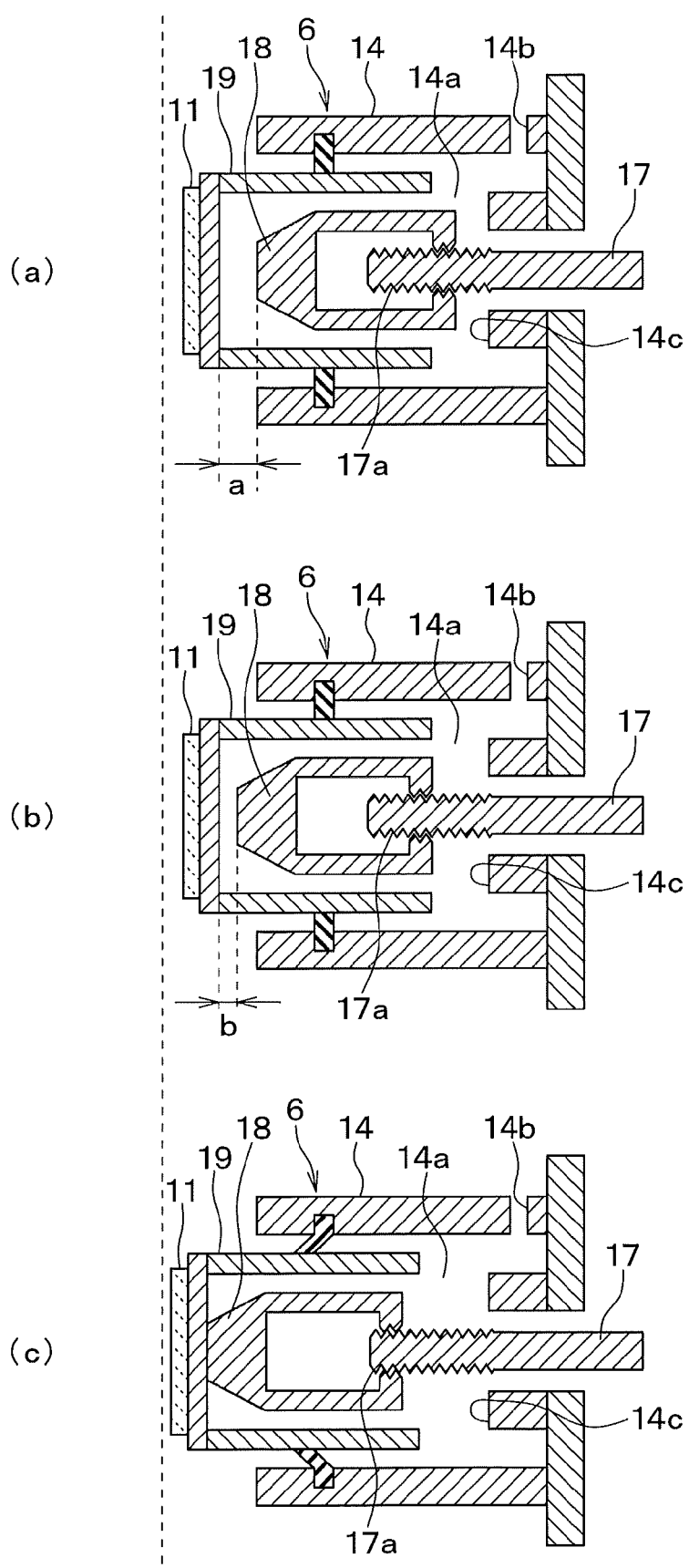
FIG. 3 is a simplified cross-sectional schematic diagram of the rear wheel brake mechanism, and shows an operation to inhibit rolling back of a vehicle at the time of an engine stall on a slope.

In order to inhibit rolling back of the vehicle at the time of an engine stall on a slope, it is necessary to ensure that the EPB 2 stands by so that the parking brake force can be generated more quickly when an engine stall is detected, rather than standing by in a normal released state (a release position) as in the related art. In order to generate the parking brake force more quickly by the EPB 2, it is preferable for the standby position of the EPB 2, more specifically, the standby position of the propeller shaft 18 to be set to a standby state (hereinafter referred to as an accelerator release standby state) to inhibit rolling back of the vehicle at the time of an engine stall. FIG. 3 is a simplified cross-sectional schematic diagram of the rear wheel brake mechanism, and shows an operation to inhibit rolling back of the vehicle at the time of an engine stall on a slope. This drawing is used to explain the standby position of the EPB 2 in the accelerator release standby state.

FIG. 3(*a*) shows a normal released state, such as, for example, a state when the service brake force is generated by the service brake 1 and thereafter it is released, or a state when the parking brake force is generated by the EPB 2 and thereafter it is released. In this state, the propeller shaft 18 is in a release position, and is positioned in a standby position in which a clearance between the leading end of the propeller shaft 18 and a bottom portion of the piston 19, namely, a clearance between pressing surfaces thereof is maintained to be a clearance a in the normal released state.

In contrast to this, when the rolling back of the vehicle can occur on a slope, the motor 10 is driven and the propeller shaft 18 is moved in advance to a standby position to inhibit rolling back of the vehicle at the time of an engine stall. By this, the propeller shaft 18 is moved in advance in a direction to be closer to the lock position than the release position. At this time, as shown in FIG. 3(*b*), the accelerator release standby state can be set as a standby position in which the clearance between the leading end of the propeller shaft 18 and the bottom portion of the piston 19 is a clearance b for inhibiting rolling back, the clearance b being smaller than the clearance a in the release position. Further, as shown in FIG. 3(*c*), a state in which the leading end of the propeller shaft 18 is in contact with the bottom portion of the piston 19 and the piston 19 and the brake pad 11 are slightly pushed toward the brake disc 12 side may be set as the standby position.

When the clearance b is set as shown in FIG. 3(*b*), the leading end of the propeller shaft 18 is positioned closer to the bottom portion of the piston 19. Thus, the response of the EPB 2 can be improved and the parking brake force by the EPB 2 can be generated more quickly. Therefore, the amount of rolling back of the vehicle can be reduced, and it is possible to inhibit the rolling back of the vehicle.

Further, as shown in FIG. 3(*c*), when the propeller shaft 18 is in contact with the piston 19 and the piston 19 is moved from an initial position such that the brake pad 11 is slightly pushed toward the brake disc 12 side, the response of the EPB 2 is improved. In addition, if the driver senses the rolling back of the vehicle and suddenly operates the service brake 1, the response of the service brake 1 can also be improved. More specifically, when the service brake 1 is operated, the brake pad 11 has already been moved closer to the brake disc 12, and it is therefore possible to generate the service brake force more quickly.

However, in the state shown in FIG. 3 (*c*), the clearance between the brake pad 11 and the brake disc 12 is reduced, and therefore there is a possibility that they may come into contact with each other. In this case, a brake dragging feeling may be caused or brake noise may occur. Therefore, the mode of FIG. 3(*b*) or FIG. 3(*c*) may be selected as appropriate, depending on whether the response improvement of the service brake 1 is prioritized or whether prioritization is given to the issue of the brake dragging feeling or brake noise. In the case of the present embodiment, the position shown in FIG. 3(*b*) is taken as a first standby position and the position shown in FIG. 3(*c*) is taken as a second standby position, and the standby position is selected in accordance with the inclination of a road surface, as will be described later.

Next, the EPB control processing, which is performed by the EPB-ECU 9 in the vehicle brake system according to the present embodiment, will be explained in detail with reference to FIG. 4 to FIG. 17.

Figure 4:
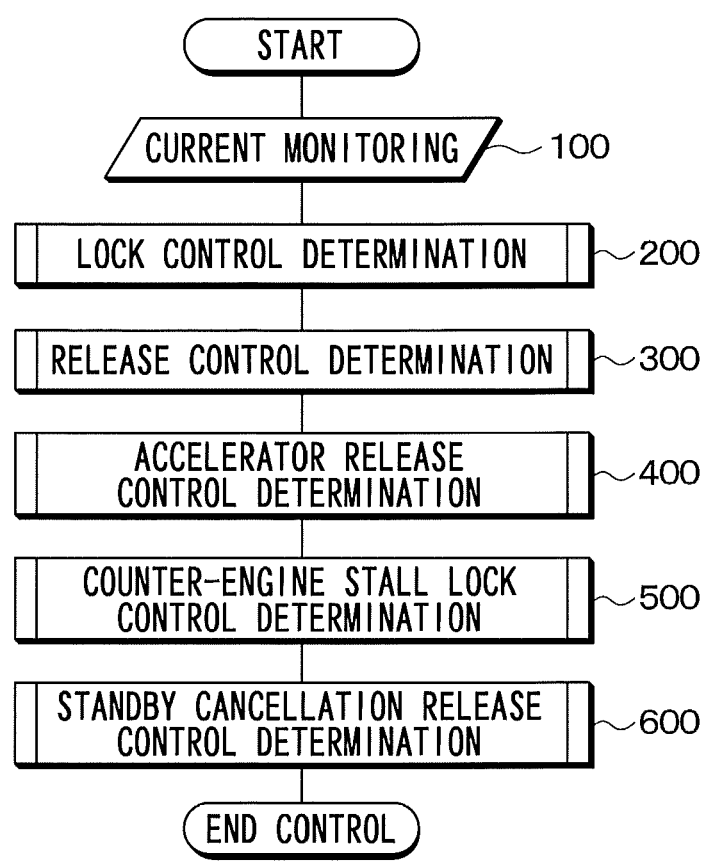
FIG. 4 is a flowchart showing entire EPB control processing.

FIG. 4 is a flowchart showing the entire EPB control processing. The processing shown in this drawing is performed at every predetermined control cycle during a period in which, for example, an ignition switch is ON, and is continuously performed even when an engine stall occurs.

At step 100, current monitoring processing is performed. More specifically, the motor current value is detected. Then, lock control determination processing at step 200, release control determination processing at step 300, accelerator release control determination processing at step 400, counter-engine stall lock control determination processing at step 500 and standby cancellation release control determination processing at step 600 are performed based on the motor current value (hereinafter referred to as the monitored current value) detected by the current monitoring processing.

Figure 5:
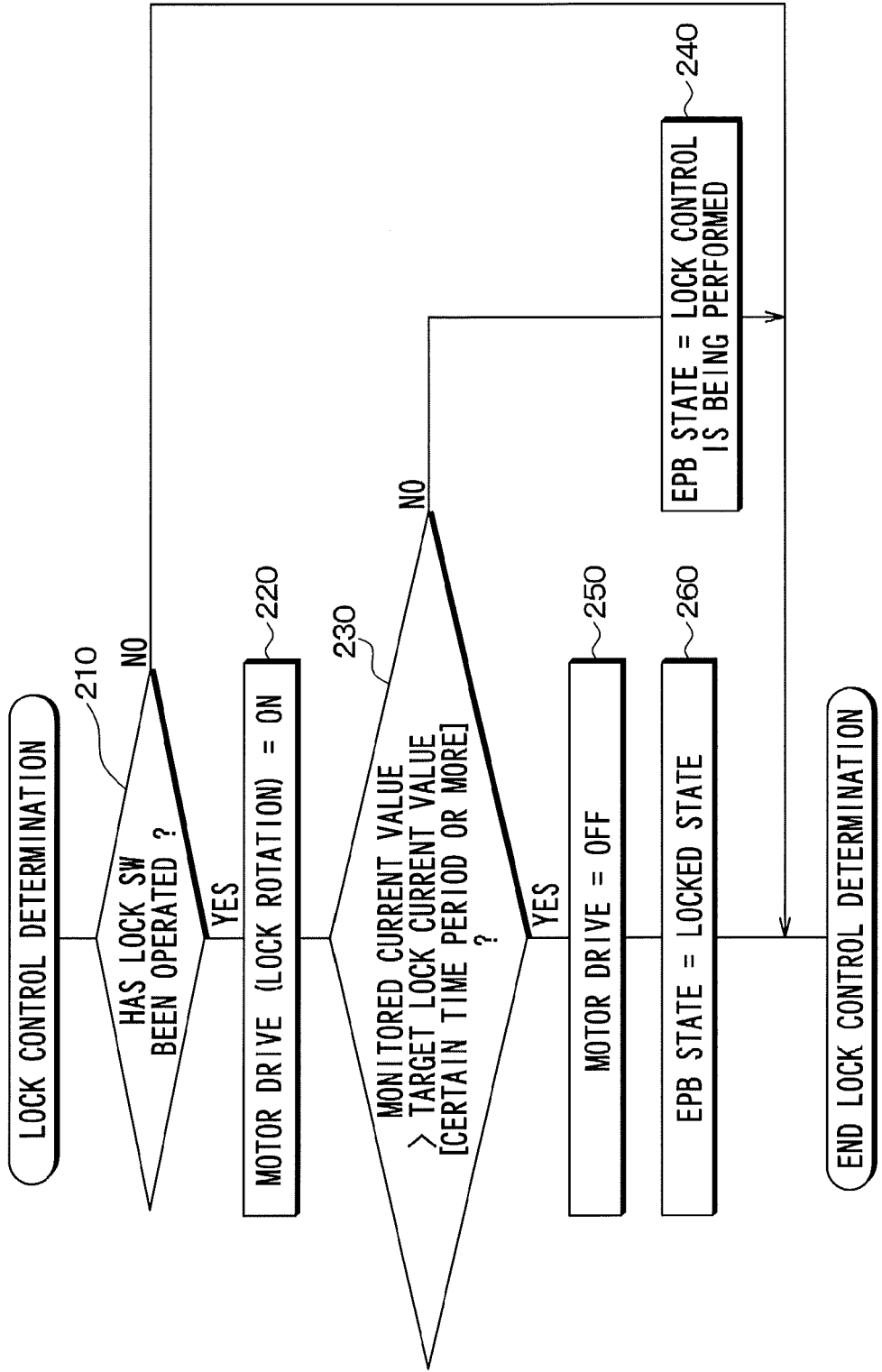
FIG. 5 is a flowchart showing, in detail, lock control determination processing.

FIG. 5 is a flowchart showing, in detail, the lock control determination processing shown at step 200 in FIG. 4. In this processing, the lock control is performed to cause the wheel to be locked when a lock operation is performed by the driver.

First, at step 210, it is determined whether or not a switch operation has been performed to execute the lock control. This determination is performed based on a signal indicating an operation state of the operation SW 23. The ON state of the operation SW 23 indicates that the driver intends to establish a locked state by actuating the EPB 2 by the lock control, and the OFF state indicates that the driver intends to cause the EPB 2 to be in a released state by the release control. Therefore, when the operation SW 23 switches from OFF to ON, it is determined that the switch operation has been performed to execute the lock control. If a negative determination is made here, the processing is directly terminated, and if an affirmative determination is made, the processing proceeds to step 220.

At step 220, the motor drive is switched on, and the motor 10 is rotated in a positive direction, in other words, the motor 10 is rotated in a direction that causes the wheel to be locked. In accordance with the positive rotation of the motor 10, the spur gear 15 is driven and the spur gear 16 and the rotation shaft 17 are rotated. The meshing between the male screw groove 17*a* and the female screw 18*a* causes the propeller shaft 18 to move to the brake disc 12 side. Along with this, the piston 19 is also moved in the same direction, and thus the brake pads 11 are moved to the brake disc 12 side.

Then, the processing proceeds to step 230. On the condition that a certain time period has elapsed, it is determined whether or not the monitored current value in this control cycle has exceeded a target lock current value. The motor current (the monitored current value) varies in accordance with a load applied to the motor 10. In the case of the present embodiment, since the load applied to the motor 10 corresponds to the pressing force that presses the brake pads 11 against the brake disc 12, it has a value that corresponds to the pressing force generated by the motor current. Therefore, if the motor current exceeds the target lock current value, a state is achieved in which a desired parking brake force has been generated by the generated pressing force. More specifically, a state is achieved in which frictional surfaces of the brake pads 11 are pressed against an inner wall surface of the brake disc 12 with a certain degree of force by the EPB 2. Therefore, it is possible to detect whether the desired parking brake force has been generated, based on whether or not the monitored current value has exceeded the target lock current value.

Note that the certain time period is set to a period which is equal to or longer than a period that is assumed to be necessary for a rush current that may occur at the start of the lock control to converge, and which is shorter than a minimum time period that is assumed to be necessary for the lock control. For example, it is assumed that the count-up of a not-shown lock control time counter is started at the same time as when the motor drive is switched on, and when the counter reaches a count number that corresponds to the certain period, it is assumed that the certain time period has elapsed. This prevents an affirmative determination from being erroneously made at this step when the rush current exceeds the target lock current value.

Then, the processing proceeds to step 240 until the affirmative determination is made at step 230. By setting a lock control flag, for example, it is indicated that the EPB state is a state in which the lock control is being performed, and the processing is terminated. Thus, the processing at step 230 is repeated. Then, if an affirmative determination is made at this step, the processing proceeds to step 250 and the motor drive is switched off. After that, the processing proceeds to step 260, and it is indicated that the EPB state is a locked state by resetting the lock control flag and setting a lock state flag, for example. In this manner, the lock control determination processing is complete. Note that the position of the propeller shaft 18 at a time when the locked state is established by the lock control in this manner is referred to as a lock position.

Figure 6:
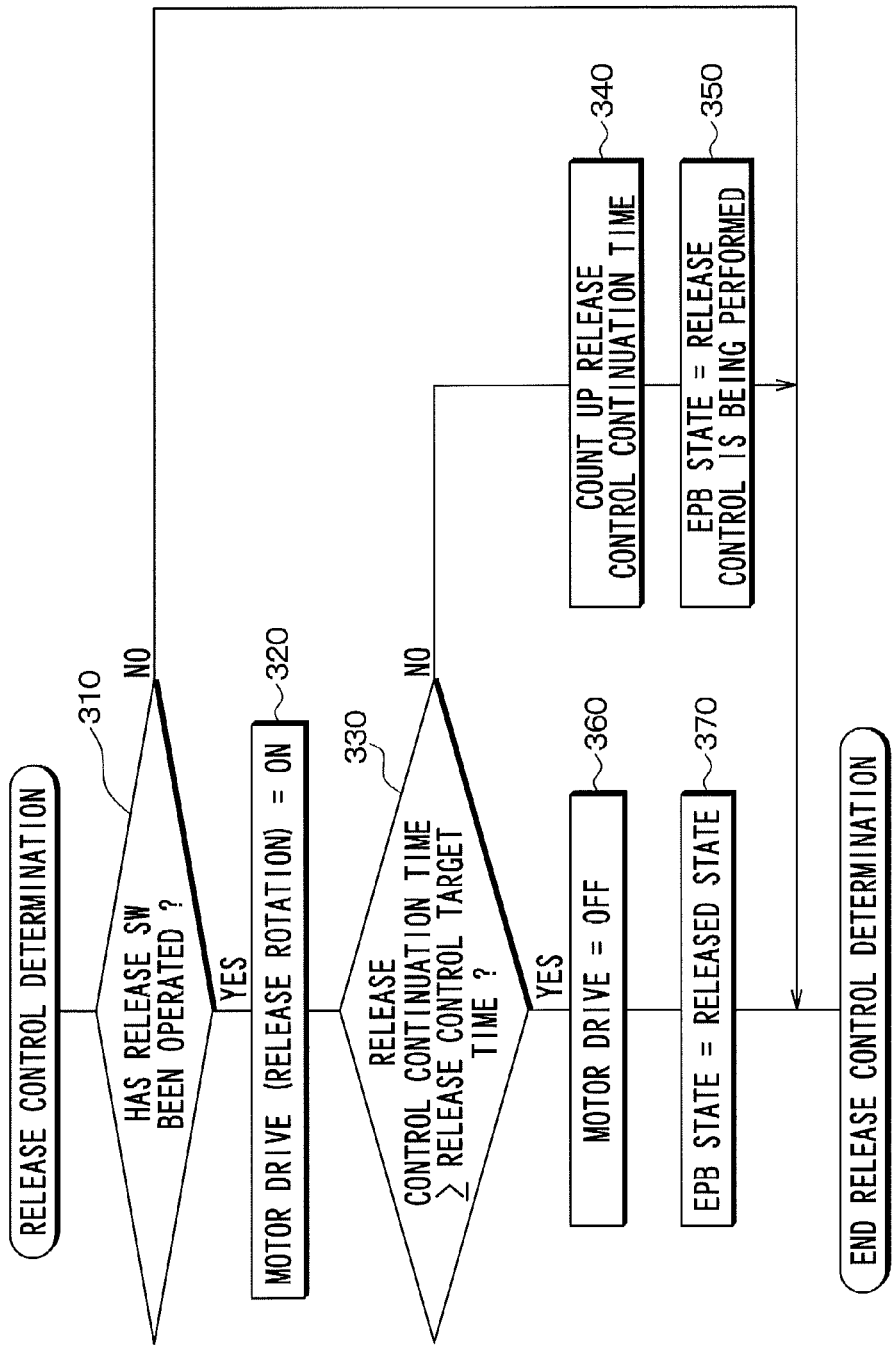
FIG. 6 is a flowchart showing, in detail, release control determination processing.

FIG. 6 is a flowchart showing, in detail, the release control determination processing shown at step 300 in FIG. 4. In this processing, the release control is performed to cause the wheel to be released when a release operation is performed by the driver.

First, at step 310, it is determined whether or not a switch operation has been performed to execute the release control. This determination is performed based on a signal indicating an operation state of the operation SW 23. As described above, the OFF state of the operation SW 23 indicates that the driver intends to release the EPB 2 by the release control. Therefore, when the operation SW 23 switches from ON to OFF, it is determined that the switch operation has been performed to execute the release control. If a negative determination is made here, the processing is directly terminated. If an affirmative determination is made, the processing proceeds to step 320. Further, at this time, the lock state flag shown in FIG. 5 is reset to indicate that the EPB state is no longer the locked state.

At step 320, the motor drive is switched on, and the motor 10 is reversely rotated, in other words, the motor 10 is rotated in a direction that causes the wheel to be released. In accordance with the reverse rotation of the motor 10, the spur gear 15 is driven and the spur gear 16 and the rotation shaft 17 are rotated. The meshing between the male screw groove 17*a* and the female screw 18*a* causes the propeller shaft 18 to move in a direction away from the brake disc 12. Along with this, the piston 19 is also moved in the same direction, and thus the brake pads 11 are separated from the brake disc 12.

Then, the processing proceeds to step 330, and it is determined whether or not a release control continuation time has exceeded a release control target time. The release control continuation time is an elapsed time from the start of the release control. For example, if the motor drive is switched on at step 320, a not-shown release control continuation time counter starts to count up at step 340 that will be described later. When the counter reaches a count number that corresponds to the release control target time, it is assumed that the release control target time or more has elapsed. The release control target time is a time that is assumed to be necessary to change from the lock position, in which the wheel is in a locked state by the above-described lock control processing, to the release position in the normal released state, namely, the standby position in which the clearance between the leading end of the propeller shaft 18 and the bottom portion of the piston 19 is maintained to be the clearance a, as shown in FIG. 3 (*a*). The release control target time is set based on a movement amount or the like of the propeller shaft 18, which corresponds to the number of rotations of the motor 10.

Then, the processing proceeds to step 340 until an affirmative determination is made at step 330, and the count-up of the release control continuation time counter is performed. After that, the processing proceeds to step 350. By setting a release control flag, for example, it is indicated that the EPB state is a state in which the release control is being performed, and the processing is terminated. Thus, the processing at step 330 is repeated. Meanwhile, if an affirmative determination is made at step 330, the processing proceeds to step 360 and the motor drive is switched off. After that, the processing proceeds to step 370, and it is indicated that the EPB state is a released state by resetting the release control flag and setting a release state flag, for example. In this manner, the release control determination processing is complete.

Figure 13:
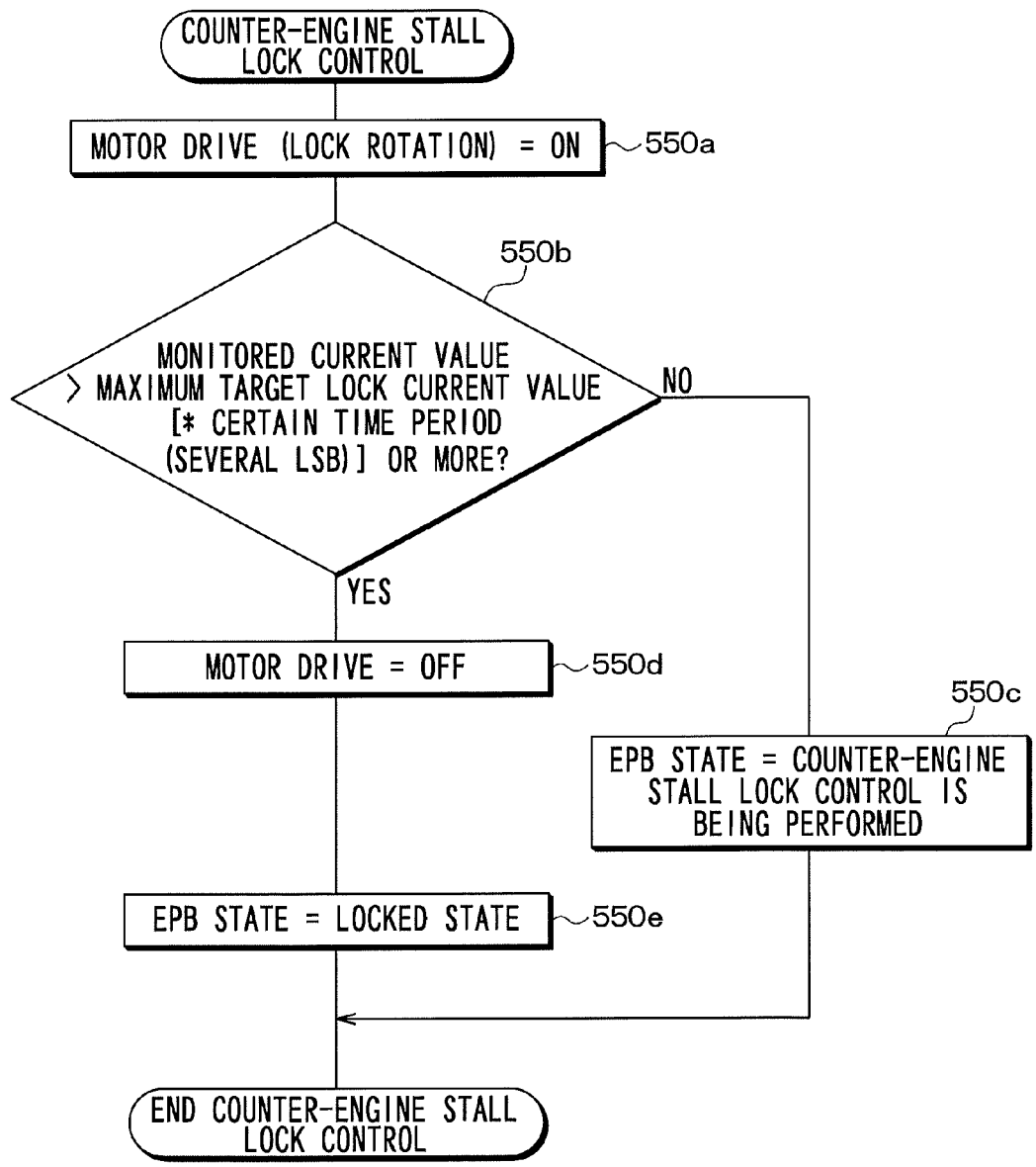
FIG. 13 is a flowchart showing, in detail, counter-engine stall lock control.

Note that the release state flag is reset when the locked state is established, and is reset at the same time as when the EPB state is changed to the locked state at step 260 in FIG. 5 and step 550*e* in FIG. 13 that will be described later.

Figure 7:
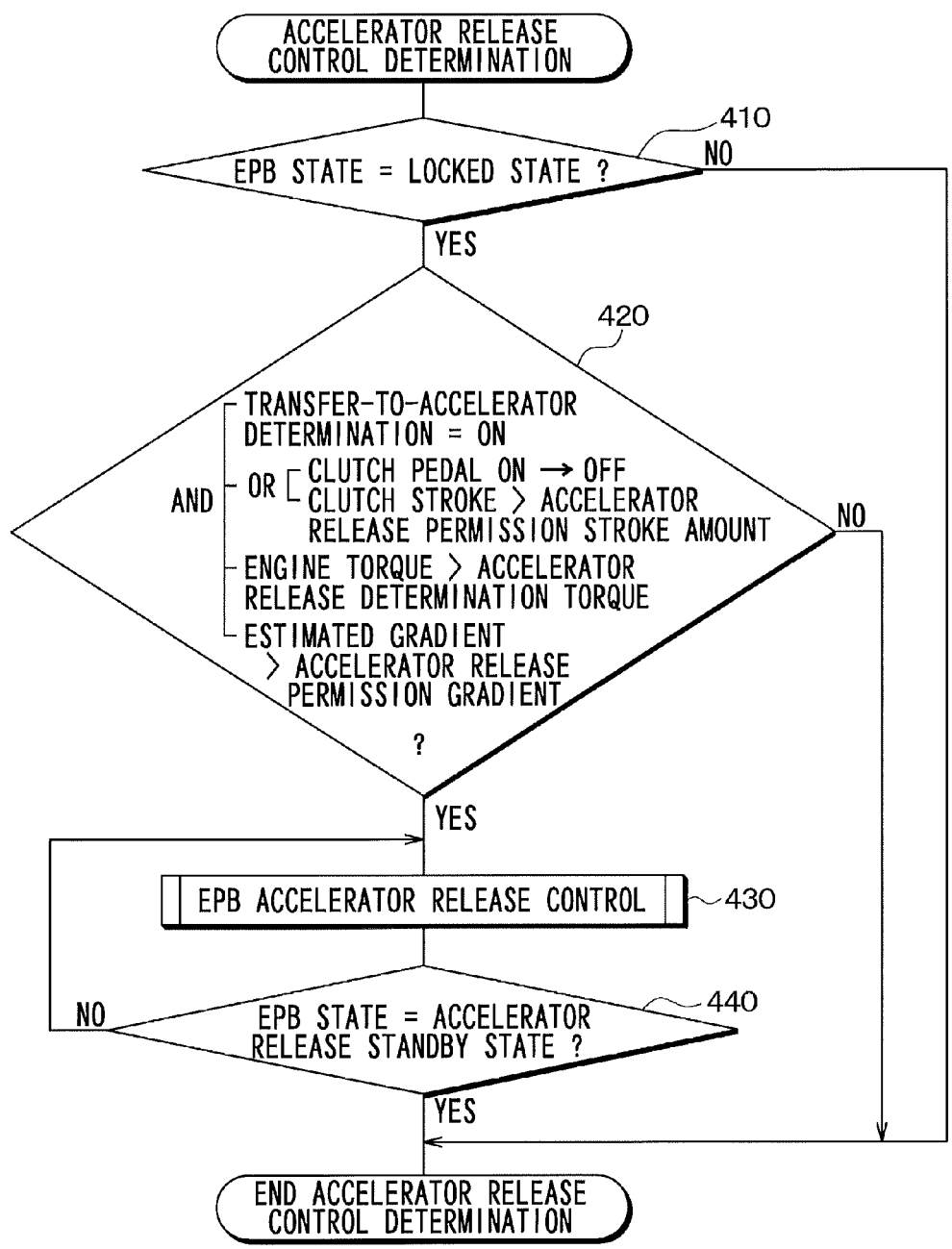
FIG. 7 is a flowchart showing, in detail, accelerator release control determination processing.

FIG. 7 is a flowchart showing, in detail, the accelerator release control determination processing shown at step 400 in FIG. 4. In this processing, it is determined whether or not conditions that change the EPB 2 to be in the accelerator release standby state are satisfied. When the conditions are satisfied, the accelerator release control is performed to inhibit rolling back of the vehicle at the time of an engine stall on a slope.

First, at step 410, it is determined whether or not the EPB state is the locked state. As a result of this, it is determined whether or not the EPB 2 is automatically brought into a locked state by slope holding control, in addition to a situation in which the driver starts to move the vehicle after the lock operation has been performed when the vehicle is stopped on a slope. The slope holding control is control that causes a parking brake force to be automatically generated by the EPB 2 when the vehicle is stopped on a road surface having a predetermined inclination or more, in order to inhibit rolling back of the vehicle on a slope, and is performed regardless of the lock operation by the driver. In this case also, the wheel is locked by the EPB 2. In these cases, if the propeller shaft 18 is returned to the release position when the vehicle starts to move, the rolling back of the vehicle at the time of an engine stall on the slope becomes larger. Therefore, if a negative determination is made here, the processing is terminated because there is no need to perform the acceleration release control. If an affirmative determination is made, the processing proceeds to step 420.

At step 420, it is determined whether or not execution conditions for the acceleration release control are satisfied. The situation to execute the accelerator release control is a situation in which an engine stall may occur on a slope where the vehicle can roll back. This type of situation is used as the execution condition for the accelerator release control. Here, the execution conditions are set to a state in which a transfer-to-accelerator determination is turned on and the clutch is intended to be engaged, and also in which depression of the accelerator is started and the slope can cause rolling back.

In the transfer-to-accelerator determination, it is determined whether the driver's foot has been transferred from the brake pedal to the accelerator pedal. When the foot has been transferred to the accelerator pedal, the transfer-to-accelerator determination is changed from OFF to ON. This determination can be made, for example, by inputting data relating to the accelerator opening or the engine speed, which is handled by the engine ECU 27. When the accelerator opening increases from an idle state, or when the engine speed increases from an idling speed, it is determined that the transfer-to-accelerator determination is ON.

Whether or not the clutch is to be engaged is determined based on whether the clutch pedal has been switched from ON to OFF, or based on whether the clutch stroke has exceeded an accelerator release permission stroke amount that is set in advance. The ON or OFF of the clutch pedal can be determined based on a detection signal of the pedal stroke sensor 26 that detects a depression state of the clutch pedal, and the clutch stroke can also be determined based on the detection signal of the pedal stroke sensor 26. The clutch stroke indicates a decreased amount of depression of the clutch pedal, and a state in which the clutch pedal is depressed to the maximum is taken as zero. Further, the accelerator release permission stroke amount is set to a clutch stroke that corresponds to a position in which the clutch is to be engaged, such as a partial clutch engagement position, for example.

Whether or not the depression of the accelerator has been started is determined based on whether or not the engine torque exceeds an accelerator release determination torque. The accelerator release determination torque is set to an engine torque at which it is assumed that the accelerator is depressed. The engine torque is handled by the engine ECU 27, and therefore, this determination can be performed by receiving data relating to the engine torque from the engine ECU 27.

Note that, this determination and the above-described transfer-to-accelerator determination are performed because the depression of the accelerator is used as the condition to release the locked state of the EPB 2 in order to start moving the vehicle. These determinations are performed redundantly and need not necessarily be performed. Only one of them may be performed.

The inclination of the road surface on which the vehicle is stopped can be estimated based on a detection signal of the longitudinal G sensor 25. Therefore, whether or not the slope can cause rolling back is determined by determining whether or not the estimated inclination exceeds an accelerator release permission gradient. The accelerator release permission gradient is a value that is set in advance as a gradient at which it is assumed that rolling back can occur. However, the situation in which the vehicle rolls back at the time of starting to move is not limited to a case in which it is intended to move the vehicle forward on an uphill slope, and also occurs when it is intended to move the vehicle rearward on a downhill slope. Therefore, the accelerator release permission gradient is set to a gradient (a positive gradient, for example) corresponding to an uphill slope when a forward gear, such as the first gear or the second gear, is engaged or when no gear is engaged, and is set to a gradient (a negative gradient, for example) corresponding to a downhill slope when the gear shift is in the reverse (R) position.

Figure 10:
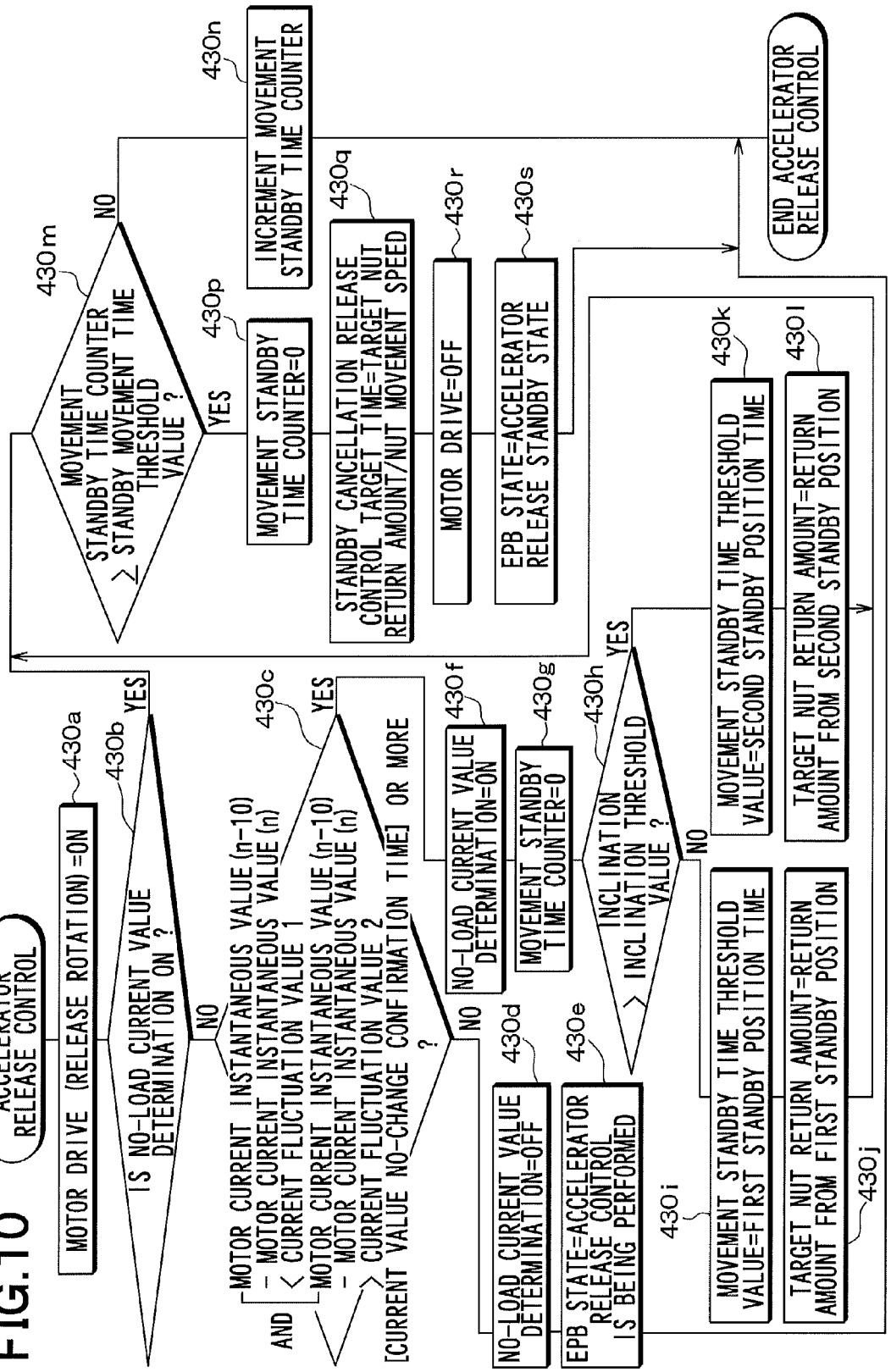
FIG. 10 is a flowchart showing, in detail, accelerator release control processing.

When these types of execution conditions for the accelerator release control are satisfied, the processing proceeds to step 430, and accelerator release control processing is performed by the EPB 2. FIG. 10 is a flowchart showing, in detail, the accelerator release control processing.

First, at step 430*a*, the motor drive is switched on. More specifically, the motor 10 is reversely rotated in a direction that causes the wheel to be released. In accordance with the reverse rotation of the motor 10, the spur gear 15 is driven and the spur gear 16 and the rotation shaft 17 are rotated. The meshing between the male screw groove 17*a* and the female screw 18*a* causes the propeller shaft 18 to move in a direction away from the brake disc 12. Along with this, the piston 19 is also moved in the same direction, and thus the brake pads 11 are separated from the brake disc 12.

Then, the processing proceeds to step 430*b*, and it is determined whether or not a current value determination is ON. The no-load current value determination is a determination that is performed at the next step 430*c*, and determines whether the monitored current value has reached a current value at which the motor 10 is in a no-load state. In an initial stage in which the motor drive is started at step 430*a*, the no-load current value determination has not yet been turned ON. Therefore, first, a negative determination is made at step 430*b*.

After that, the processing proceeds to step 430*c* and the no-load current value determination is performed. Here, it is determined whether or not a state in which the current value does not vary continues for a current value no-change confirmation time or longer. That is, when the motor 10 is brought into a no-load state, the monitored current value becomes a no-load current value and is held constant. Therefore, when this state continues for a predetermined time period, it is determined that the no-load state is established. Note, however, that the monitored current value, namely, a motor current real value has a certain degree of variation due to an influence of noise or the like, and the value fluctuates. Therefore, in the present embodiment, it is determined whether or not a difference between a motor current real value (n−10) in a control cycle preceding by a predetermined number of cycles (here, ten cycles, for example) and a motor current real value (n) in this control cycle is smaller than a current fluctuation value 1, which corresponds to a first no-load current determination current value, and larger than a current fluctuation value 2, which corresponds to a second no-load current determination current value.

Figure 11:
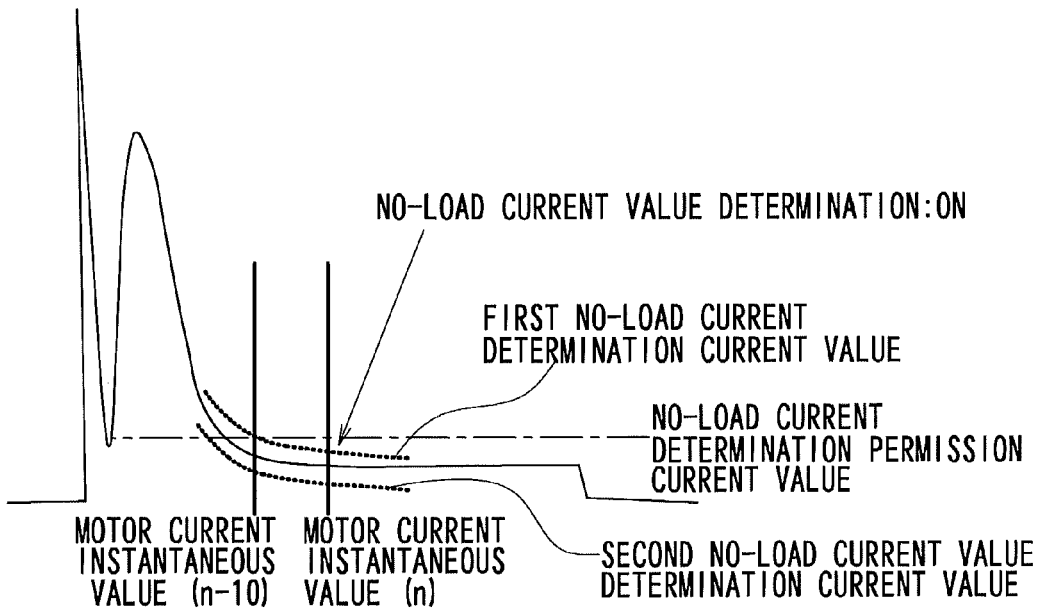
FIG. 11 is a diagram showing changes in motor current and an image of no-load current value determination.

FIG. 11 is a diagram showing changes in motor current and an image of the no-load current value determination. As shown in this drawing, if the difference between the motor current real value (n) in this control cycle and the motor current real value (n−10) in the control cycle preceding by the predetermined number of cycles is a value between the first and second no-load current value determination current values (the current fluctuation values are 1 and 2), it is determined that the no-load current value is reached. Note that there may be a case in which the no-load current is erroneously determined when there is almost no clearance between the brake pad 11 and the brake disc 12. Therefore, by performing this determination only when the motor current value is equal to or less than a no-load current value determination permission current value, it is thus possible to further reduce erroneous determination.

Therefore, until an affirmative determination is made at step 430*c*, the processing proceeds to step 430*d* and the no-load current value determination is turned off. After that, the processing proceeds to step 430*e* and, for example, an accelerator release control flag is set to indicate that the accelerator release control is being performed. Thus, the processing is terminated. Then, if an affirmative determination is made at step 430*c*, the processing proceeds to step 430*f* and the no-load current value determination is turned on.

Further, the processing proceeds to step 430*g* and a movement standby time counter is set to 0. The movement standby time counter counts a time that is necessary to move the EPB 2 to a desired standby position. Here, the movement standby time counter is used to measure a movement standby time from when the no-load current value determination is made at a moment at which the brake pads 11 are separated from the brake disc 12 to when the standby position is reached. The movement standby time is a value that is determined corresponding to the standby position, and differs depending on whether the standby position is the first standby position or the second standby position. Here, since the standby position has not yet been determined, the movement standby time counter is set to 0.

Next, the processing proceeds to step 430$h$, and it is determined whether or not the inclination of the road surface on which the vehicle is currently stopped exceeds a steep inclination threshold value. The estimated gradient that is calculated based on the detection signal of the longitudinal G sensor 25 is used as the inclination of the road surface. The steep inclination threshold value is a determination threshold value that is used to set the standby position. If the current inclination exceeds the steep inclination threshold value, it means that the inclination is relatively large, and if the inclination is equal to or less than the steep inclination threshold value, it means that the inclination is relatively small. Therefore, in order to set the standby position corresponding to the inclination of the road surface, if a negative determination is made at step 430$h$, the processing proceeds to step 430$i$ and a movement standby time threshold value is set to a first standby position time, namely, the movement standby time that is necessary to change the standby position of the EPB 2 to the first standby position. Further, the processing proceeds to step 430$j$ and a target nut return amount is set to a return amount from the first standby position. The target nut return amount is an amount that is used when the propeller shaft 18 (nut) is returned to the release position after the accelerator release control. Further, when an affirmative determination is made at step 430$h$, the processing proceeds to step 430$k$ and the movement standby time threshold value is set to a second standby position time, namely, the movement standby time that is necessary to change the standby position of the EPB 2 to the second standby position. Further, the processing proceeds to step 430$l$, and the target nut return amount is set to a return amount from the second standby position.

When the movement standby time threshold value is set in this manner, the processing proceeds to step 430$m$, and it is determined whether or not the movement standby time counter has reached a count value that corresponds to the movement standby time threshold value set at step 430$i$ or 430$k$, namely, whether or not the propeller shaft 18 has reached the first standby position or the second standby position. Until an affirmative determination is made here, the propeller shaft 18 has not reached the first standby position or the second standby position, and thus, the processing proceeds to step 430$n$. The movement standby time counter is incremented and the processing is terminated. In this case, an affirmative determination is made at step 430$b$ from the next control cycle onwards. Therefore, again, the processing at step 430$m$ is repeatedly performed and the count-up of the movement standby time counter is continued until the propeller shaft 18 reaches the first standby position or the second standby position. After that, if an affirmative determination is made at step 430$m$ and the propeller shaft 18 reaches the first standby position or the second standby position, the processing proceeds to processing from step 430$p$ onwards.

Then, after the movement standby time counter is set to 0 at step 430$p$, the processing proceeds to step 430$q$ and a standby cancellation release control target time is set. The standby cancellation release control target time is a time that is necessary to return from the first standby position or the second standby position to the release position when standby cancellation release control is performed, and is calculated by dividing the target nut return amount by a nut movement speed. The target nut return amount is the value set at the above-described step 430$j$ or 430$l$. The nut movement speed is a movement speed of the propeller shaft 18 along with the rotation of the motor 10, and is calculated by multiplying a pitch of the female screw groove 18$a$ formed in the propeller shaft 18 by a rotation speed of the motor 10 when no load is applied thereto. The rotation speed of the motor 10 when no load is applied thereto can be determined based on a fixed value or characteristics of a voltage applied to the motor 10 and the number of rotations. After that, the processing proceeds to step 430$r$ and the motor drive is switched off. The processing further proceeds to step 430$s$, and the EPB state is changed to the accelerator release standby state by setting an accelerator release standby state flag, for example. Thus, the processing is terminated.

When the accelerator release control processing is terminated in this manner, the processing proceeds to step 440 shown in FIG. 7 and it is determined whether or not the EPB state is the accelerator release standby state. This determination is made based on whether or not the accelerator release standby state flag set at the above-described step 430$s$ in FIG. 10 has been set. Then, the accelerator release control is continued until the accelerator release standby state is established. When the accelerator release standby state is established, the accelerator release control determination processing is terminated.

Figure 8:
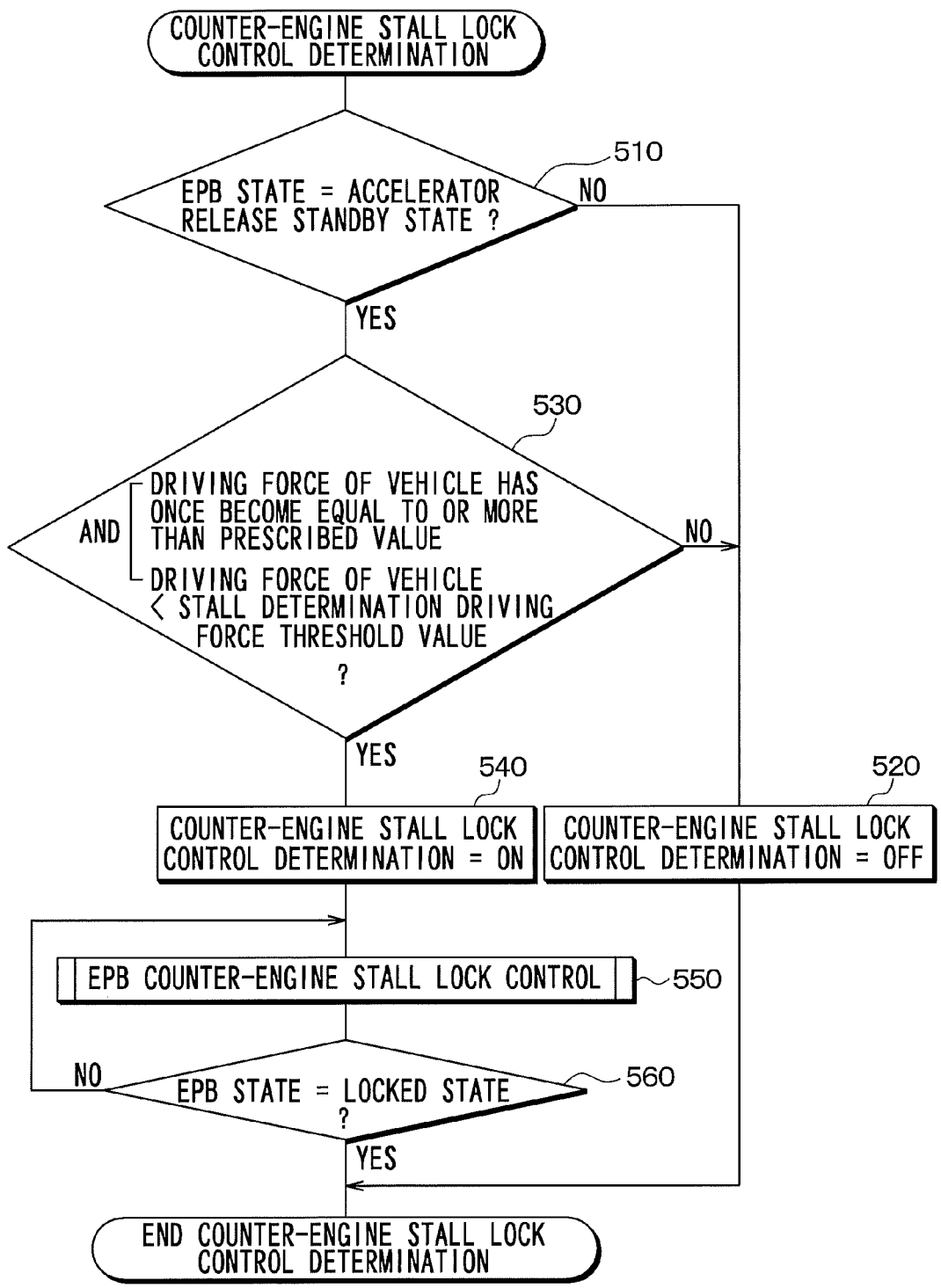
FIG. 8 is a flowchart showing, in detail, counter-engine stall lock control determination processing.

FIG. 8 is a flowchart showing, in detail, counter-engine stall lock control determination processing shown at step 500 in FIG. 4. This processing detects a start failure in which the vehicle cannot start to move normally and an engine stall occurs, and performs the counter-engine stall lock control that actuates the EPB 2 at the time of an engine stall and thereby causes the wheels to be locked.

First, at step 510, it is determined whether or not the EPB state is the accelerator release standby state. This determination is made using the same method as that of the above-described step 440 in FIG. 7. If a negative determination is made here, there is no need to perform the counter-engine stall lock control. Therefore, the processing proceeds to step 520 and the counter-engine stall lock control determination is turned off. The processing is directly terminated. If an affirmative determination is made here, the processing proceeds to step 530.

At step 530, it is determined whether or not the driving force of the vehicle has once become equal to or more than a prescribed value, and whether or not the driving force is less than a stall determination driving force threshold value. More specifically, it is determined whether or not the vehicle is in a state in which it is unable to start moving because the driving force is small and only an amount of driving force has been generated at which an engine stall is possible.

Figure 12:
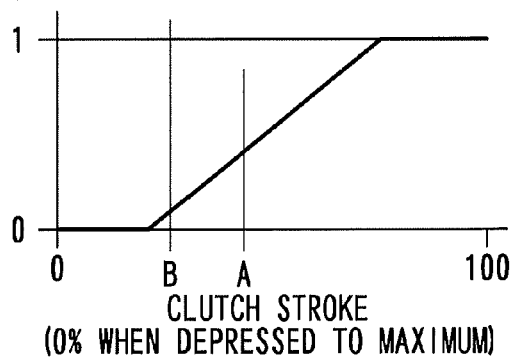
FIG. 12 is a diagram showing a relationship between a clutch stroke and a clutch transmission coefficient.

Using the relationship between the clutch stroke and the clutch transmission coefficient shown in FIG. 12, for example, the driving force of the vehicle can be calculated based on the mathematical expression, vehicle driving force=engine torque×clutch transmission coefficient. The stall determination driving force threshold value is a value which is used to determine whether the driving force of the vehicle is insufficient and an engine stall can occur, and which is set to, for example, a lower limit value of the driving force that is necessary to inhibit an engine stall. When the driving force of the vehicle is less than the stall determination driving force threshold value, it may be determined that the engine stall occurs immediately. However, in order to inhibit an erroneous determination from being made, in which the counter-engine stall lock control is performed even when the engine stall does not occur in an initial period of an operation of starting to move, it is confirmed whether the driving force has once become equal to or more than the prescribed value.

It is sufficient that the prescribed value is set to a value that can be used to confirm that the operation to engage the clutch is started.

When an affirmative determination is made at step 530 in this manner, the processing proceeds to step 540, and the counter-engine stall lock control determination is turned on. The processing proceeds to step 550. Note that, although here it is determined whether the driving force of the vehicle has once become equal to or more than the prescribed value, if it is determined whether or not an operation time from the beginning of the operation to start moving has exceeded a prescribed time period or more, it is also possible to inhibit the erroneous determination described above from being made. Further, after the start of the operation to engage the clutch has been confirmed based on the clutch stroke, there is a case in which the clutch pedal is depressed again and the operation to start moving is halted. Also in this case, it is not possible to start the vehicle moving. Therefore, also when the clutch stroke is equal to or less than a predetermined reference value, it may be determined that it is not possible to start the vehicle moving and that the counter-engine stall lock control is to be performed. Then, the processing may proceed to step 540 and the counter-engine stall lock control determination may be turned on.

Then, the processing proceeds to step 550 and the counter-engine stall lock control is performed. FIG. 13 is a flowchart showing, in detail, the counter-engine stall lock control. In this processing, in order to inhibit rolling back of the vehicle at the time of an engine stall, an operation that actuates the EPB 2 and locks the wheel is performed.

First, at step 550a, the motor drive is switched on. In other words, the motor 10 is rotated in a positive direction, namely, a direction that causes the wheel to be locked. In accordance with the positive rotation of the motor 10, the spur gear 15 is driven and the spur gear 16 and the rotation shaft 17 are rotated. The meshing between the male screw groove 17a and the female screw 18a causes the propeller shaft 18 to move to the brake disc 12 side. Along with this, the piston 19 is also moved in the same direction, and thus the brake pads 11 are moved to the brake disc 12 side. At this time, as described above, the EPB 2 is brought into the accelerator release standby state by the accelerator release control. In other words, the propeller shaft 18 is moved to the first or second standby position. Therefore, when an engine stall is detected, the piston 19 and the brake pad 11 can be immediately pressed by the propeller shaft 18, and it is possible to quickly generate a parking brake force.

After that, the processing proceeds to step 550b and it is determined whether or not the monitored current value is exceeding a maximum target lock current value. In this determination, it may be determined whether or not the monitored current value in this control cycle is exceeding the maximum target lock current value. However, in order to exclude a case in which the monitored current value is increased by noise, it is preferable to determine whether or not this state continues for a certain time period (that corresponds to several control cycles). The maximum target lock current value indicates a maximum value of current that is allowed, by the EPB 2, to flow to the motor 10 as a design value. Since the maximum value of current is allowed to flow to the motor 10 in this manner, a larger parking brake force can be generated. It is thus possible to reliably stop the vehicle even in a situation in which the vehicle rolls back, namely, a situation that cannot be controlled by the driver, and it is possible to reliably stop the vehicle even when the braking force deteriorates due to shaking of the vehicle. Note that, although the maximum target lock current value is used here, any value can be used as long as it is larger than a current value that is used to establish a normal locked state.

Here, the processing proceeds to step 550c until an affirmative determination is made at step 550b. By setting a counter-engine stall lock control flag, for example, it is indicated that the EPB state is a state in which the counter-engine stall lock control is being performed, and the processing is terminated. In this case, the counter-engine stall lock control is continued and the motor drive is switched on. Then, if an affirmative determination is made at step 550b, it is assumed that a sufficiently large parking brake force has been generated. Therefore, the processing proceeds to step 550d and the motor drive is switched off. After that, the processing proceeds to step 550e, and it is indicated that the EPB state is a locked state by resetting the counter-engine stall lock control flag and setting the lock state flag, for example. In this manner, the counter-engine stall lock control processing is complete.

When the counter-engine stall lock control processing is terminated in this manner, the process proceeds to step 560 shown in FIG. 8 and it is determined whether or not the EPB state is a locked state. This determination is made based on whether or not the lock state flag set at the above-described step 550e in FIG. 13 has been set. Then, the counter-engine stall lock control is continued until the locked state is established. When the locked state is established, the counter-engine stall lock control determination processing is terminated.

Figure 9:
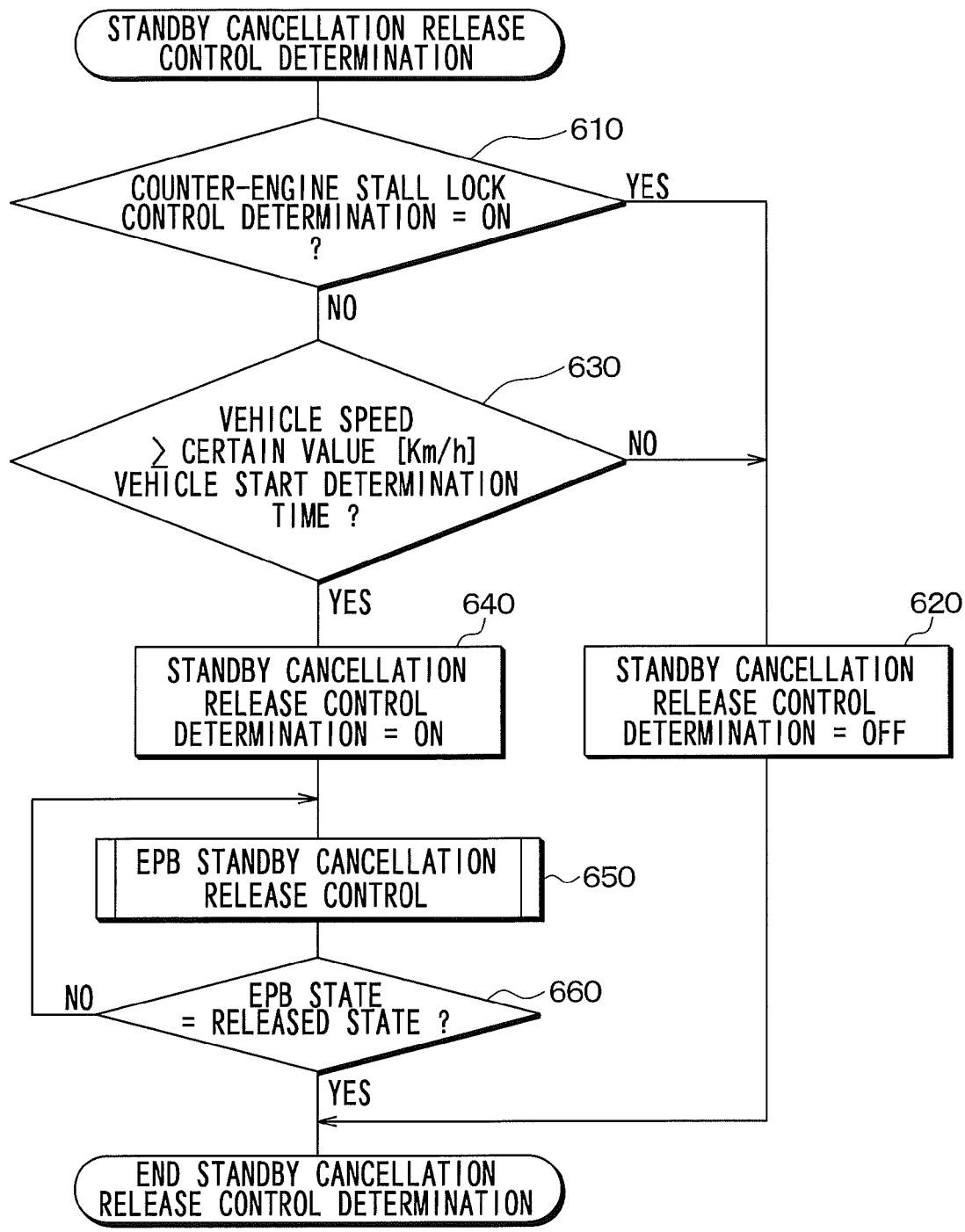
FIG. 9 is a flowchart showing, in detail, standby cancellation release control determination processing.

FIG. 9 is a flowchart showing, in detail, the standby cancellation release control determination processing shown at step 600 in FIG. 4. This processing detects that the vehicle has started to move normally and has transitioned to traveling without any engine stall, and performs EPB standby cancellation release control such that the standby position of the EPB 2 is returned to the release position from the standby position for the counter-engine stall lock control.

First, at step 610, it is determined whether or not the counter-engine stall lock control determination has been turned on. When this has been turned on, EPB standby cancellation release control should still not be performed. Therefore, the processing proceeds to step 620 and the standby cancellation release determination is turned off. The processing is directly terminated. Then, if a negative determination is made at step 610, the processing proceeds to step 630 and it is determined whether or not the vehicle speed has reached a certain value [km/h], namely, whether or not a time at which the vehicle has reached a vehicle speed at which it is assumed that the vehicle has started moving has reached a vehicle start determination time that is determined in advance. For example, this determination is performed by measuring an elapsed time from when the vehicle speed exceeds the certain value, and comparing the elapsed time and the vehicle start determination time.

Figure 14:
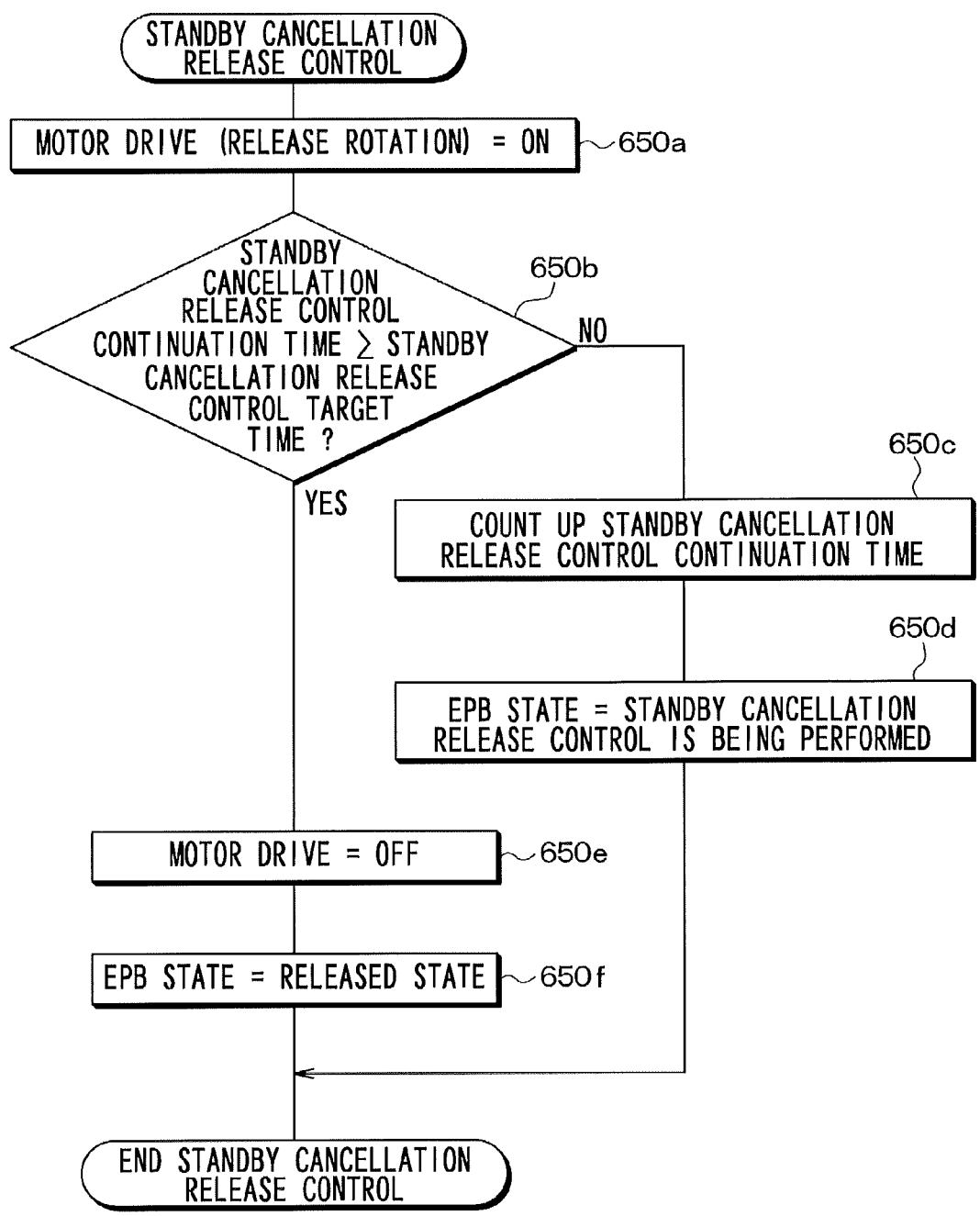
FIG. 14 is a flowchart showing, in detail, EPB standby cancellation release control.

After that, until an affirmative determination is made at step 630, it is still too early to determine that the vehicle has started to move normally, and therefore, the processing proceeds to step 620. If an affirmative determination is made, the processing proceeds to step 640 and the standby cancellation release determination is turned on. Then, the processing proceeds to step 650 and the EPB standby cancellation release control is performed. FIG. 14 is a flowchart showing, in detail, the EPB standby cancellation release control. In this processing, the affirmative determination is made at step 630 shown in FIG. 9, namely, the vehicle has started to move normally without an engine stall occurring. Therefore, control is performed such that the standby position of the EPB 2 is returned to the release position from the standby position for the counter-engine stall lock control.

First, at step 650*a*, the motor drive is switched on. More specifically, the motor 10 is reversely rotated in a direction that causes the wheel to be released. In accordance with the reverse rotation of the motor 10, the spur gear 15 is driven and the spur gear 16 and the rotation shaft 17 are rotated. The meshing between the male screw groove 17*a* and the female screw 18*a* causes the propeller shaft 18 to move in a direction away from the brake disc 12. Along with this, the piston 19 is also moved in the same direction, and thus the brake pads 11 are separated from the brake disc 12.

Then, the processing proceeds to step 650*b*, and it is determined whether or not a standby cancellation release control continuation time has exceeded the standby cancellation release control target time. The standby cancellation release control continuation time is an elapsed time from the start of the standby cancellation release control. For example, if the motor drive is switched on at step 650*a*, a not-shown standby cancellation release control continuation time counter starts to count up at step 650*c* that will be described later. When the counter reaches a count number that corresponds to a standby cancellation release control target time, it is assumed that the standby cancellation release control target time or more has elapsed. The standby cancellation release control target time is a time that is assumed to be necessary to move the propeller shaft 18 from the standby position in the above-described counter-engine stall lock control processing to the release position, namely, the standby position in which the clearance between the leading end of the propeller shaft 18 and the bottom portion of the piston 19 is maintained to be the clearance a as shown in FIG. 3(*a*). The standby cancellation release control target time is set based on a movement amount or the like of the propeller shaft 18, which corresponds to the number of rotations of the motor 10.

Then, the processing proceeds to step 650*c* until an affirmative determination is made at step 650*b*, and the count-up of the standby cancellation release control continuation time counter is performed. After that, the processing proceeds to step 650*d*. By setting a standby cancellation release control flag, for example, it is indicated that the EPB state is a state in which the standby cancellation release control is being performed, and the processing is terminated. Thus, the processing at steps 650*c* and 650*d* is repeated. Meanwhile, if an affirmative determination is made at step 650*b*, the processing proceeds to step 650*e* and the motor drive is switched off. After that, the processing proceeds to step 650*f*, and it is indicated that the EPB state is a released state by resetting the release control flag and setting the release state flag, for example. In this manner, the standby cancellation release control determination processing is complete.

Figure 15:
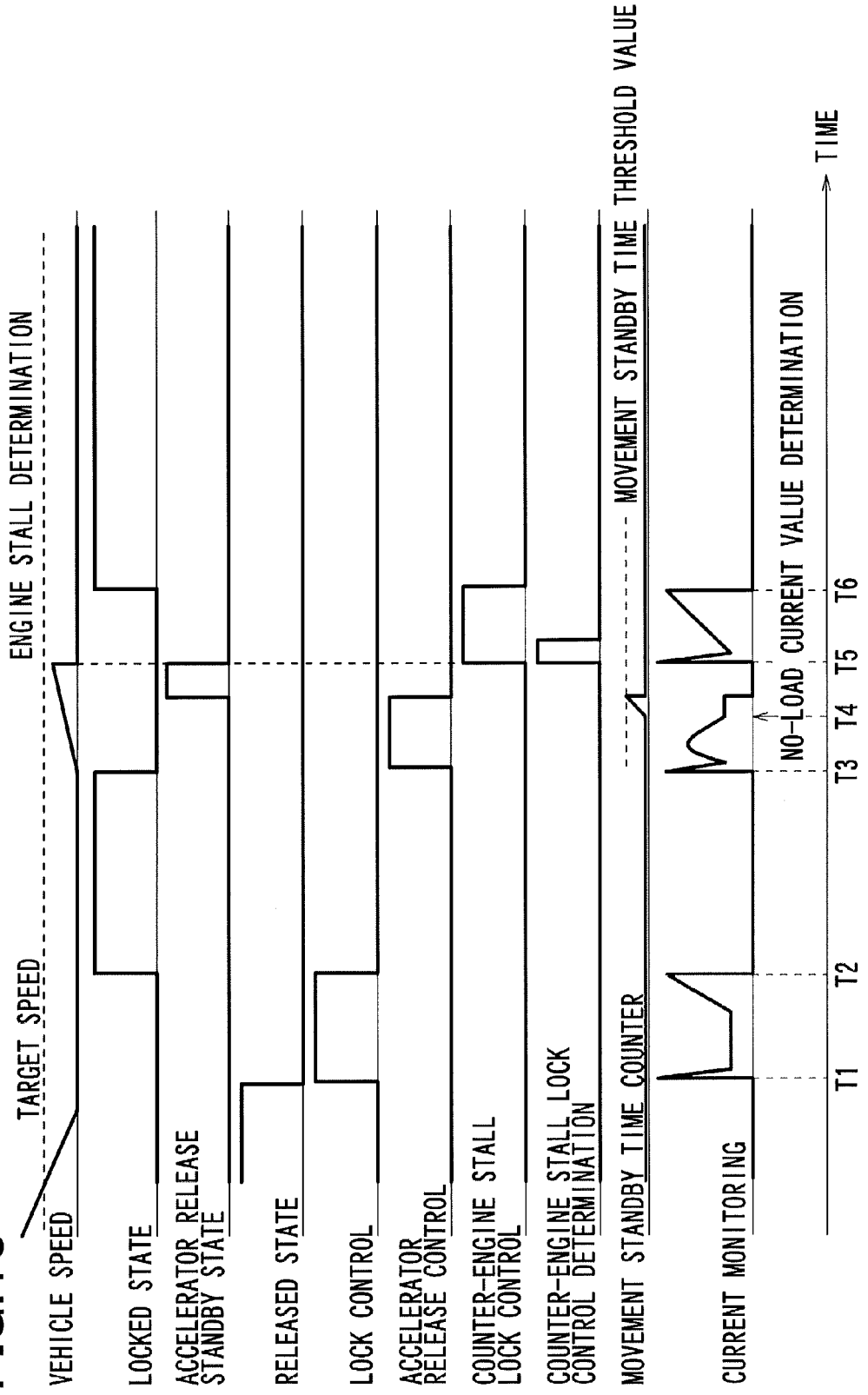
FIG. 15 is a timing chart when the EPB control processing is performed.
Figure 16:
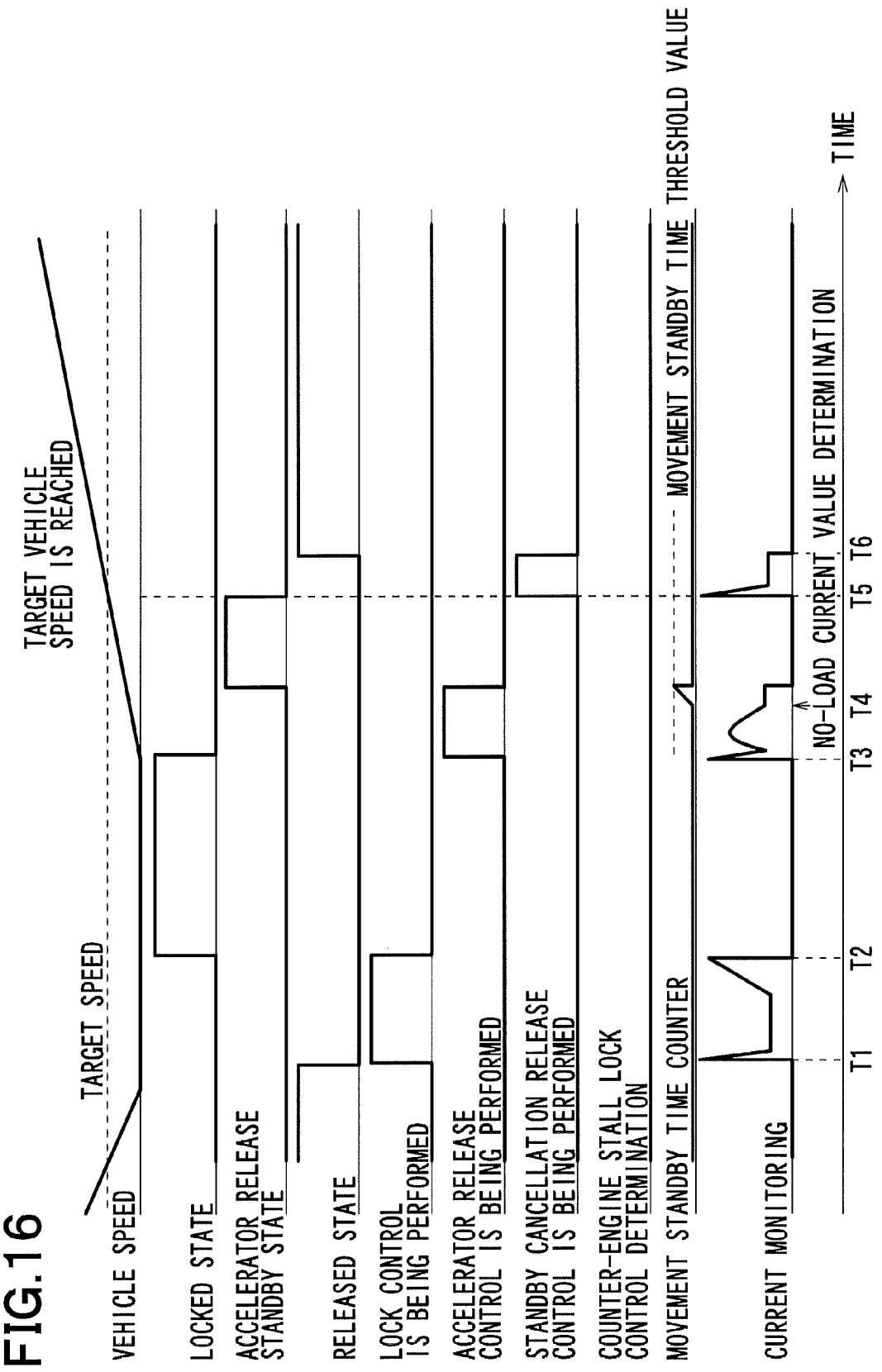
FIG. 16 is a timing chart when the EPB control processing is performed.

The EPB control processing is terminated as described above. FIG. 15 and FIG. 16 are timing charts when the EPB control processing is performed as described above. FIG. 15 is the timing chart when an engine stall occurs on a slope, and FIG. 16 is the timing chart when the vehicle starts to move normally without an engine stall occurring on the slope.

First, as shown in FIG. 15, the state before the stopping of the vehicle is shown before a time point T1, where the released state is established and another state is not established. When the vehicle stops in this state and the lock control is started, for example, by operating the operation SW 23 on the slope, the lock control is performed from the time point T1. Then, after the motor current is monitored and a rush current is generated, when the monitored current value reaches the target lock current value at a time point T2, the lock control is complete and the locked state is established.

Figure 17:
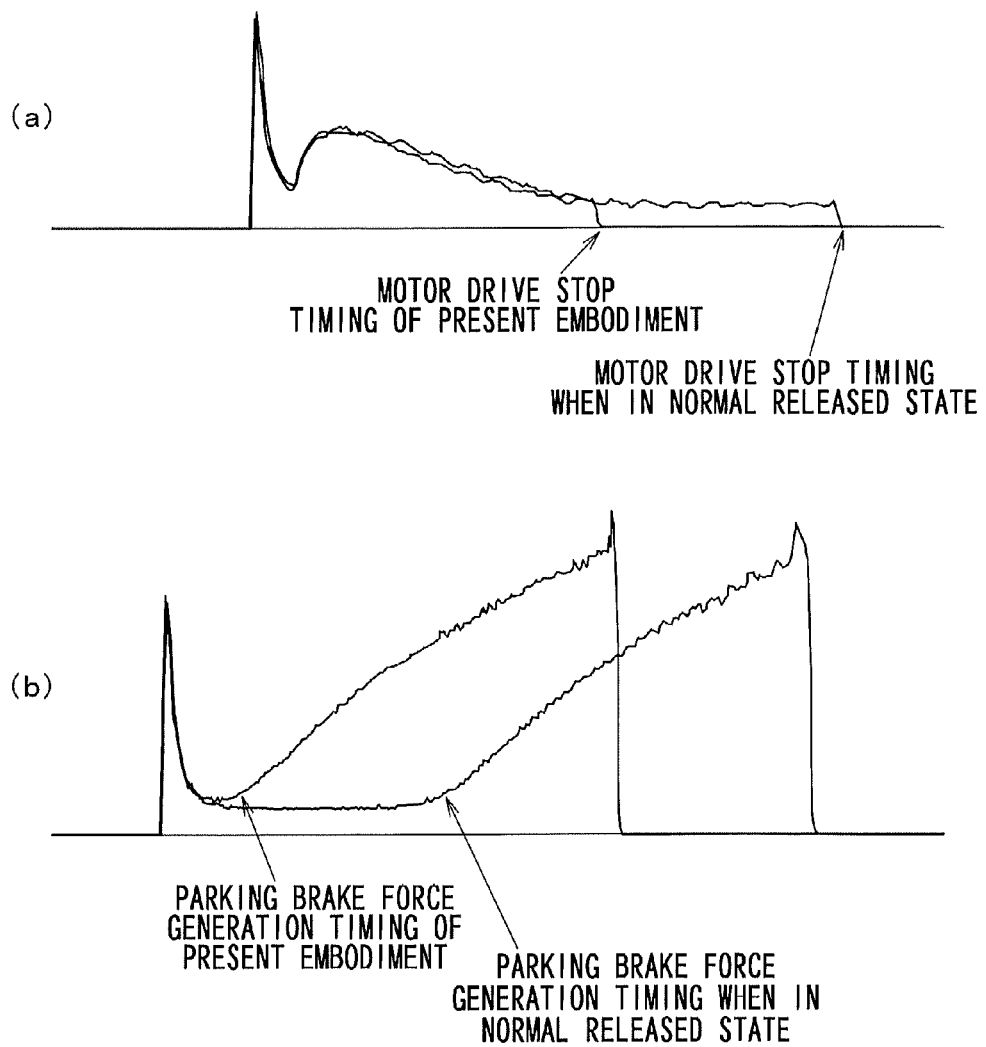
FIG. 17($a$) is a timing chart showing timings at which a motor drive is stopped, and FIG. 17($b$) is a timing chart showing changes in motor current.

After that, when the driver intends to start moving the vehicle at a time point T3, the accelerator release control is performed simultaneously. Then, after the monitored current value of the motor current is confirmed and a rush current is generated, a no-load state is determined at a time point T4 and the no-load current value determination is turned on. After the motor drive is continued until the movement standby time counter reaches the movement standby time threshold value, the motor drive is stopped and the accelerator release standby state is established. More specifically, as shown in FIG. 17(*a*), when a normal released state is to be established, the motor drive is performed from when the no-load state is established to when the clearance a is formed between the leading end of the propeller shaft 18 and the bottom portion of the piston 19. In the case of the present embodiment, the motor drive is stopped in a short time from the establishment of the no-load state.

If an engine stall occurs at a time point T5 in this state, the counter-engine stall lock control determination is turned on. In response to this, counter-engine stall lock control is started. At this time, the accelerator release standby state has already been established and the standby position of the EPB 2 is the first standby position or the second standby position. Therefore, it is possible to generate a parking brake force immediately after the start of the counter-engine stall lock control. More specifically, in a normal released state, after the no-load state is maintained for a time period corresponding to the clearance a, the brake pad 11 is pressed by the break disc 12 and the motor current is increased, as shown in FIG. 17(*b*). In contrast to this, in the case of the present embodiment, the motor current starts to increase in a short time. In this manner, the parking brake force can be generated from an earlier time point, and it is thus possible to more reliably inhibit rolling back of the vehicle. Then, when the monitored current value of the motor current reaches the maximum target lock current value at a time point T6, the counter-engine stall lock control is complete and the locked state is established again.

On the other hand, as shown in FIG. 16, although the same states as those of FIG. 15 are established from the time point T1 to the time point T4, thereafter the vehicle starts to move normally without an engine stall occurring. When the vehicle speed reaches a target vehicle speed at the time point T5, the standby cancellation release control is performed. When the accelerator release standby state is cancelled at the time point T6, the released state is established.

In this manner, in the electric parking brake control device of the present embodiment, when the vehicle is stopped on a slope, the standby position of the propeller shaft 18 is set to be closer to the lock position than the release position, namely, to the first or second standby position where the brake pads 11 can be pressed against the brake disc 12 in a shorter time. Thus, the parking brake force can be generated more quickly at the time of an engine stall, and it is possible to inhibit rolling back of the vehicle.

Further, if the first or second standby position can be selected in accordance with the inclination of the road surface on which the vehicle is stopped, it is possible to set the standby position corresponding to whether or not the parking brake force is to be generated more quickly even if a brake dragging feeling or brake noise occurs.

Note that, in the above-described explanation, the case is explained in which the accelerator release control is performed after the EPB state has been changed to the locked state. However, also when the vehicle is stopped on a slope and then the vehicle starts to move again during the lock control before the locked state is established, it is possible to perform the accelerator release control. Therefore, as shown at step 410 in FIG. 7, even when the EPB state is not the locked state but the state in which the lock control is being performed, it is preferable to perform the accelerator release control.

(Second Embodiment)

A second embodiment of the present invention will be explained. In the above-described first embodiment, when the vehicle starts to move from the locked state or the state in which the lock control is being performed, control is performed to reach the standby position (the first or second standby position) and it is thus possible to generate a parking brake force in a shorter time when the vehicle is stopped on a slope. However, due to a variation of the standby position or the like, there is a possibility of excessive contact of the brake pads 11 with the brake disc 12, thus causing brake noise or vibration, and further, brake dragging. Therefore, in the present embodiment, when there is no need to improve the response of the EPB 2 at the time of an engine stall and when priority is given to the suppression of brake noise or vibration and brake dragging, it is determined that this situation corresponds to a release priority state and the control is performed to reach the release position as in the related art, without performing the control to reach the standby position. This inhibits brake noise or vibration and brake dragging from occurring.

More specifically, in the present embodiment, it is assumed that the release priority state corresponds to a case in which the vehicle is on a flat road, a case in which the vehicle is on a low μ road whose road surface friction coefficient μ is lower than a predetermined threshold value, or a case in which a distance to an obstacle, such as another vehicle existing in a vehicle rolling back direction, is equal to or more than a predetermined distance. When the vehicle is on a flat road, there is a low possibility of the rolling back of the vehicle. When the vehicle is on a low μ road, the wheel speed may be reduced due to brake dragging, the rear wheels may be locked, or the stability of the vehicle may deteriorate as a result of a braking force difference due to a dragging level variation between the left and right wheels. Therefore, it is preferable to be in the released state, from the point of view of the stability of the vehicle. Further, when the distance to the obstacle existing in the vehicle rolling back direction is equal to or more than the predetermined distance, a problem does not occur even if the vehicle rolls back. Therefore, in these cases, the release priority state is determined, and movement to the release position is performed.

Note however that, during engine warm-up, the engine is unstable and an engine stall state is easily caused. In this type of case, even if in the release priority state, it is preferable to perform control to reach the standby position so that the response of the EPB 2 is further improved. EPB control of the present embodiment is performed in consideration of these points.

Hereinafter, the EPB control of the present embodiment will be explained in detail with reference to FIG. 18 to FIG. 28. However, the basic content of the EPB control is the same as that of the first embodiment, and thus only portions that are different from those of the first embodiment will be explained.

Figure 18:
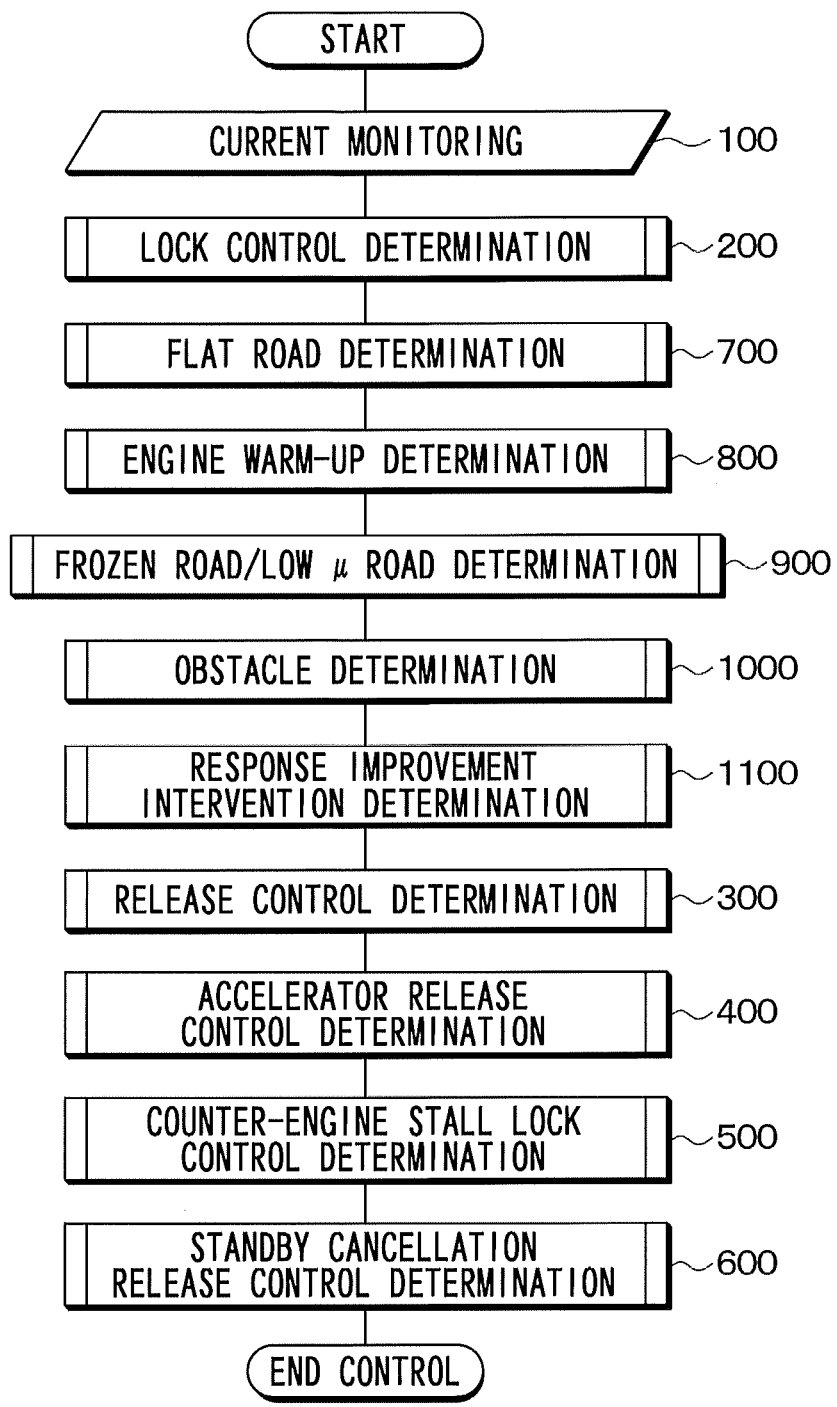
FIG. 18 is a flowchart showing entire EPB control processing according to a second embodiment of the present invention.

FIG. 18 is a flowchart showing entire EPB control processing according to the present embodiment. The processing shown in this drawing is performed at every predetermined control cycle during a period in which, for example, the ignition switch is ON, and is continuously performed even when an engine stall occurs.

First, at steps 100 and 200, the current monitoring processing and the lock control determination processing shown in the first embodiment are performed. Then, at steps 700 to 1000, it is determined whether or not it is necessary to perform control intervention in order to improve the response of the EPB 2. More specifically, flat road determination processing is performed at step 700, engine warm-up determination processing is performed at step 800, frozen road/low μ road determination processing is performed at step 900, and obstacle determination processing is performed at step 1000.

Figure 19:
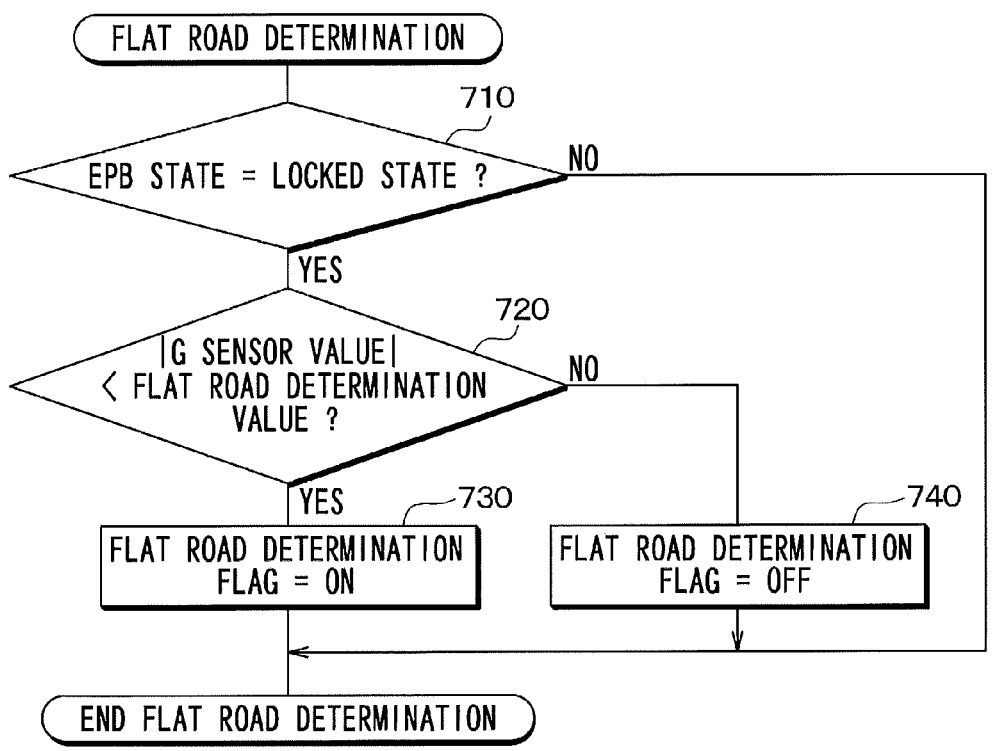
FIG. 19 is a flowchart showing, in detail, flat road determination processing.

FIG. 19 is a flowchart showing, in detail, the flat road determination processing shown at step 700 in FIG. 18. In this processing, it is determined whether or not the vehicle is on a flat road.

First, at step 710, it is determined whether or not the EPB state is a locked state. When the EPB state is a locked state, it is assumed that the vehicle is in a stopped state, and the value of the longitudinal G sensor 25 at this time is a value corresponding to a gravitational acceleration, namely, a value corresponding to a slope gradient. Therefore, when an affirmative determination is made at this step, the processing proceeds to step 720 and it is determined whether or not an output value (a G sensor value) of the longitudinal G sensor 25 is less than a flat road determination value, namely, less than a determination value indicating that the gradient is less than a predetermined road surface gradient. If an affirmative determination is made here, the road is flat. Therefore, the processing proceeds to step 730 and a flat road determination flag is turned on in order to indicate that the road is flat. If a negative determination is made here, the road is not flat. Therefore, the processing proceeds to step 740 and the flat road determination flag is turned off in order to indicate that the road is not flat. In this manner, the flat road determination processing is complete.

Figure 20:
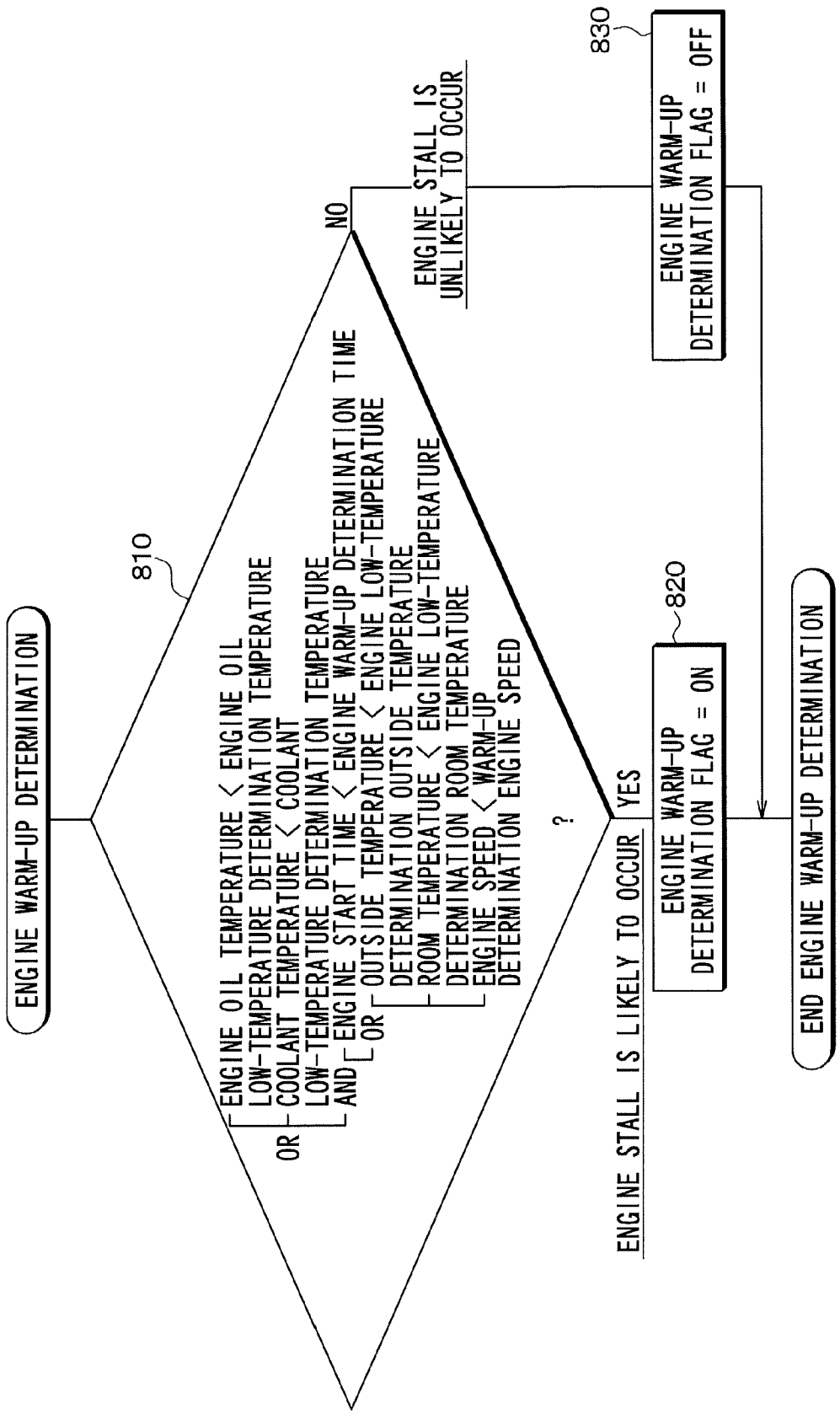
FIG. 20 is a flowchart showing, in detail, engine warm-up determination processing.

FIG. 20 is a flowchart showing, in detail, the engine warm-up determination processing shown at step 800 in FIG. 18. In this processing, it is determined whether or not warm-up of the vehicle is being performed.

First, at step 810, it is determined whether or not warm-up is being performed based on various parameters indicating that warm-up of the vehicle is being performed. More specifically, it is determined that warm-up is being performed when (1) the engine oil temperature is less than an engine oil low-temperature determination temperature, (2) the coolant temperature is less than a coolant low-temperature determination temperature, or (3) the engine start time is less than an engine warm-up determination time, and when the outside temperature or the room temperature is less than an engine low-temperature determination outside temperature or an engine low-temperature determination room temperature or the engine speed is less than a warm-up determination engine speed. The engine oil low-temperature determination temperature, the coolant low-temperature determination temperature, the engine low-temperature determination outside temperature, and the engine low-temperature determination room temperature are each set to a temperature at which it is assumed that the engine has not yet been warmed up. Further, the engine warm-up determination time is set to a time period during which it is assumed that warm-up is being performed, and the warm-up determination engine speed is set to an idle speed or the like at which it is assumed that warm-up is being performed.

When an affirmative determination is made here, the warm-up is being performed and an engine stall is likely to occur. In this case, the processing proceeds to step 820 and an engine warm-up determination flag is turned on in order to indicate that the engine warm-up is being performed. If a negative determination is made here, the engine warm-up is not being performed and an engine stall is unlikely to occur.

In this case, the processing proceeds to step 830 and the engine warm-up determination flag is turned off in order to indicate that the engine warm-up is not being performed. In this manner, the engine warm-up determination processing is complete.

Figure 21:
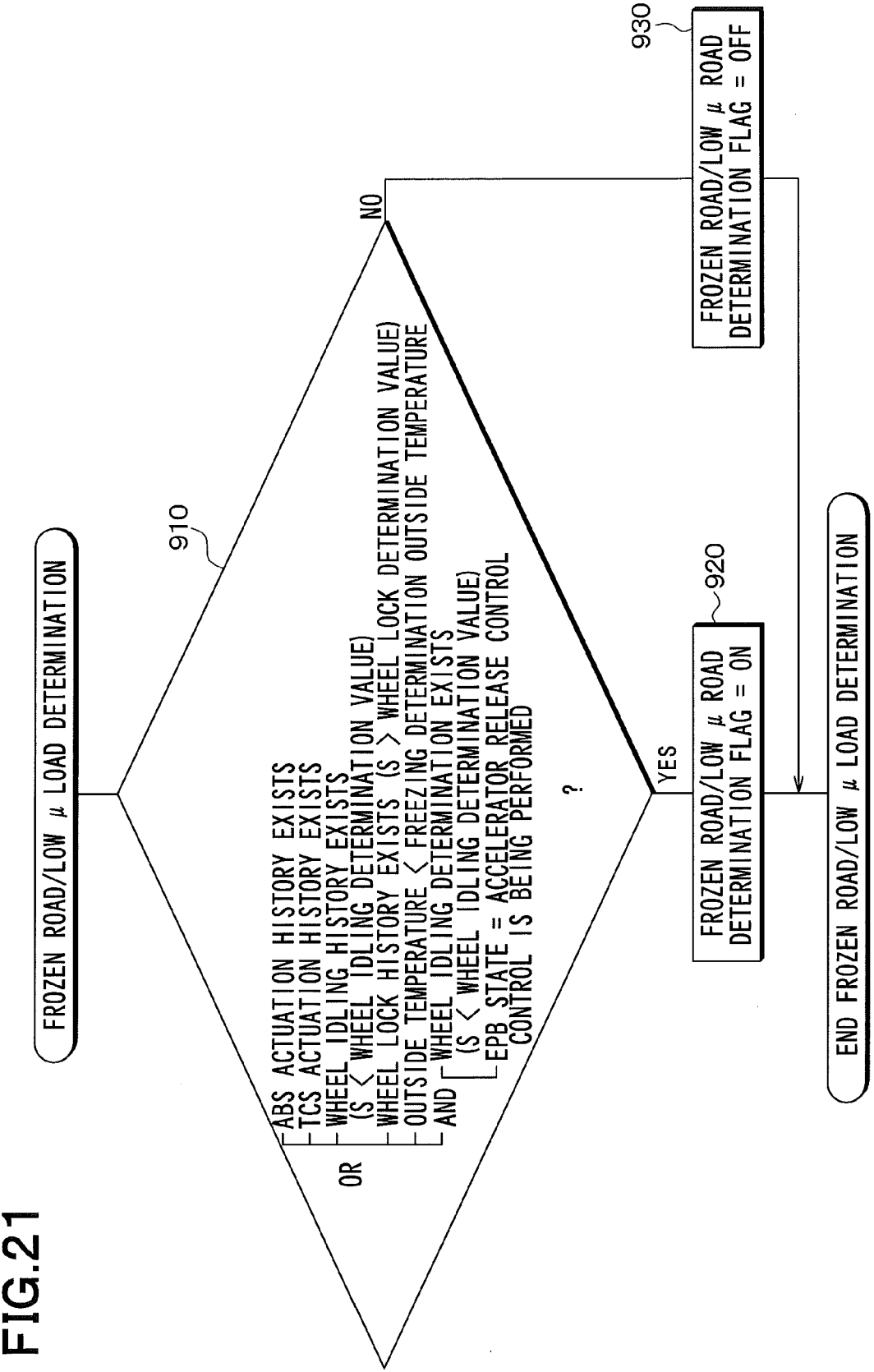
FIG. 21 is a flowchart showing, in detail, frozen road/low μ road determination processing.

FIG. 21 is a flowchart showing, in detail, the frozen road/low μ road determination processing shown at step 900 in FIG. 18. In this processing, it is determined whether or not the vehicle is on a frozen road or a low μ road. Note that, although here the frozen road and the low μ road are separately described, the frozen road is one form of the low μ road and is included in the low μ road.

First, at step 910, it is determined whether or not the road corresponds to a frozen road/low-μ road. More specifically, it is determined whether or not the road corresponds to a frozen road/low-μ road based on the existence or non-existence of an actuation history of an antilock brake system (ABS), an actuation history of a traction control system (TCS), a wheel idling history and a wheel lock history, or based on an outside temperature or on whether a wheel idling determination is made when the EPB state corresponds to a state in which the accelerator release control is being performed.

With respect to the ABS actuation history, the TCS actuation history, the wheel idling history and the wheel lock history, it is determined whether or not the history exists within a certain travel distance or a certain travel time. The ABS or the TCS is likely to be operated on a frozen road/low μ road, and the wheel idling or wheel lock is also likely to occur on a frozen road/low μ road. Therefore, when these histories exist, it is estimated that the road is a frozen road/low μ road. For example, the ESC-ECU 8 records each of the histories, and therefore, the above-described determination is performed by the EPB-ECU 9 obtaining from the ESC-ECU 8 information relating to the existence or non-existence of each of the histories. When the history is used in this manner, road conditions at a slightly earlier time are used. Therefore, the history is used on the condition that it is within the certain travel distance or the certain travel time.

Further, when the current outside temperature is lower than a freezing determination outside temperature or when the wheel idling determination is made when the EPB state corresponds to a state in which the accelerator release control is being performed, there is a possibility that the road is a frozen road/low μ road. In this type of case, even when the accelerator release control is being performed, it is preferable to stop the control to the standby position. Therefore, also in these cases, it is estimated that the road is a frozen road/low μ road.

Note that, with respect to the wheel idling, it is determined that the wheel is brought into an idling state when a slip ratio S becomes smaller than a wheel idling determination value that is a negative value (namely, a larger value on a minus side than the wheel idling determination value). The slip ratio S is calculated using a deviation ((V−Vw)/V×100%) between a vehicle speed V and a wheel speed Vw of each wheel. Further, with respect to the wheel lock, it is determined that the wheel is brought into a locked state when the slip ratio S becomes larger than a wheel lock determination value (98%, for example). When these determinations are made, it is determined that the wheel idling history and the wheel lock history exist, or it is determined that the wheel idling determination exists.

Then, when an affirmative determination is made at step 910, the processing proceeds to step 920 and a frozen road/low μ road determination flag is turned on in order to indicate that the road is a frozen road/low μ road. On the other hand, if a negative determination is made at step 910, the processing proceeds to step 930 and the frozen road/low μ road determination flag is turned off in order to indicate that the road is not a frozen road/low μ road. In this manner, the frozen road/low μ road determination processing is complete.

Figure 22:
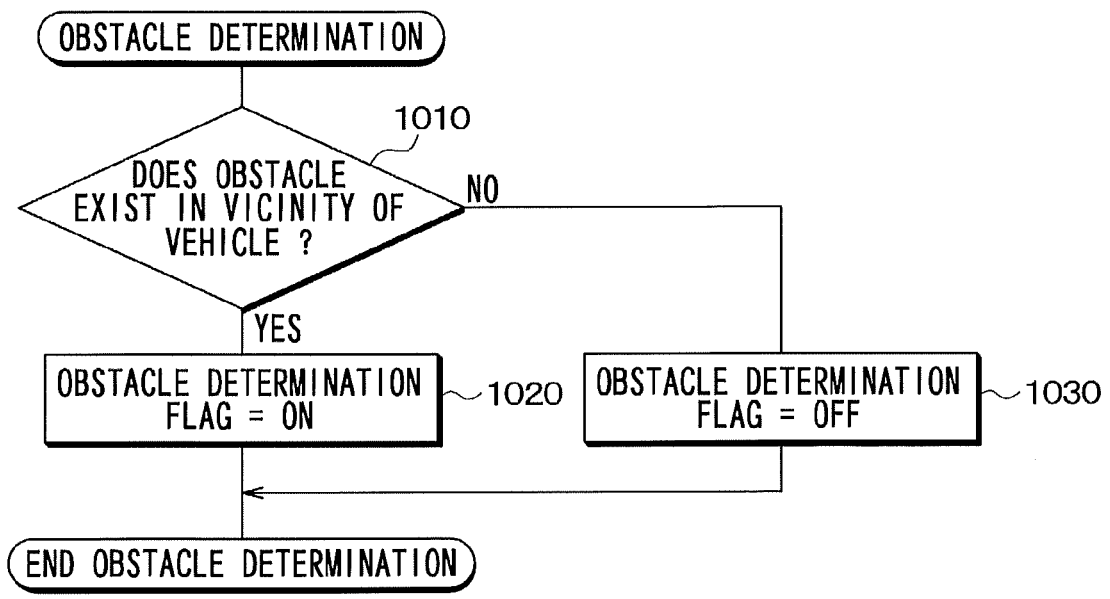
FIG. 22 is a flowchart showing, in detail, obstacle determination processing.

FIG. 22 is a flowchart showing, in detail, the obstacle determination processing shown at step 1000 in FIG. 18. In this processing, it is determined whether or not an obstacle exists within a range of a predetermined distance from the vehicle itself in a vehicle rolling back direction.

First, at step 1010, it is determined whether or not an obstacle exists in the vicinity of the vehicle. The situation in which an obstacle exists in the vicinity of the vehicle indicates a situation in which an obstacle exists within the range of the predetermined distance from the vehicle itself in a vehicle rolling back direction. For example, a back guide monitor, a clearance sonar system or the like is used as obstacle detection means, and obstacle detection is performed based on image recognition by the back guide monitor or ultrasonic wave transmission by the clearance sonar system. If the distance from the vehicle itself to the obstacle is within the predetermined distance, it is determined that the obstacle exists in the vicinity of the vehicle.

When an affirmative determination is made here, the processing proceeds to step 1020, and an obstacle determination flag is turned on in order to indicate that the obstacle exists in the vicinity of the vehicle. If a negative determination is made here, the processing proceeds to step 1030 and the obstacle determination flag is turned off in order to indicate that no obstacle exists in the vicinity of the vehicle. In this manner, the obstacle determination processing is complete.

In this manner, when the determinations as to whether or not control intervention to improve the response of the EPB 2 is necessary are completed at steps 700 to 1000, the processing proceeds to step 1100 shown in FIG. 18 and response improvement intervention determination processing is performed based on determination results of steps 700 to 1000.

Figure 23:
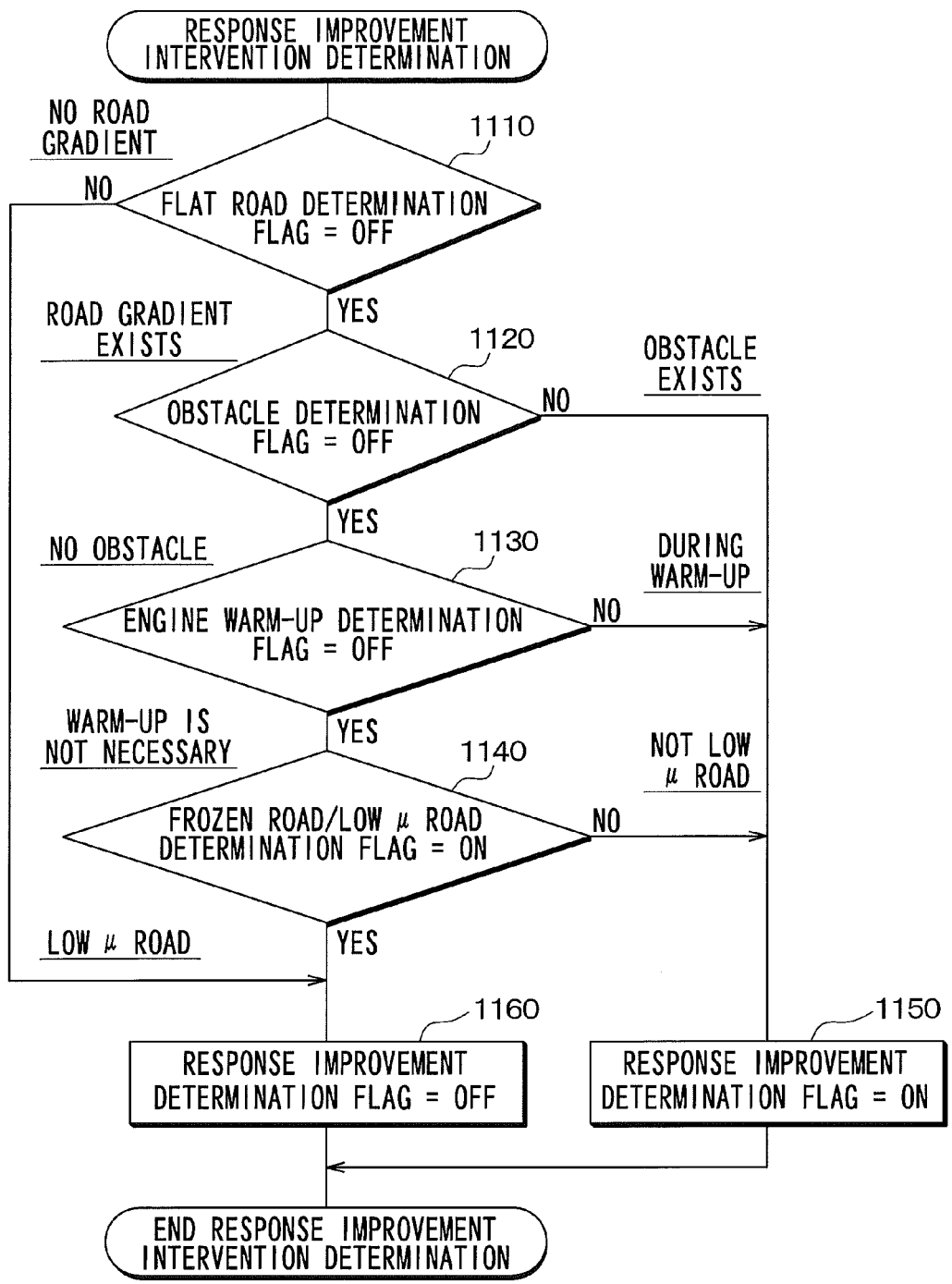
FIG. 23 is a flowchart showing, in detail, response improvement intervention determination processing.

FIG. 23 is a flowchart showing, in detail, the response improvement intervention determination processing shown at step 1100 in FIG. 18. In this processing, it is determined whether or not to perform control intervention to improve response.

First at step 1110, based on a result of the flat road determination processing shown at step 700, it is determined whether or not the flat road determination flag is in an OFF state, namely, whether the road surface gradient exists or the road surface gradient does not exist. When an affirmative determination is made here, there is a possibility of performing control intervention. Therefore, the processing proceeds to steps 1120 to 1140, and it is respectively determined whether or not the obstacle determination flag is OFF, whether or not the engine warm-up determination flag is OFF, and whether or not the frozen road/low μ road determination flag is ON. These determinations are made based on results of the obstacle determination processing shown at step 1000, the engine warm-up determination processing at step 800 and the frozen road/low μ road determination processing at step 900. If a negative determination is made in even one of them, it is necessary to perform control intervention to improve response. If a positive determination is made in all of them, there is no need to perform control intervention to improve response and this case corresponds to the release priority state.

Therefore, if a negative determination is made at one of steps 1120 to 1140, the processing proceeds to step 1150, and a response improvement intervention determination flag is turned on in order to indicate that control intervention to improve response is to be performed. On the other hand, if a negative determination is made at step 1110 or an affirmative determination is made at all of steps 1120 to 1140, the processing proceeds to step 1160 and the response improvement intervention determination flag is turned off in order to indicate that control intervention to improve response is not to be performed. In this manner, the response improvement intervention determination processing is complete.

In this manner, in the present embodiment, in the flat road determination processing at step 700, the frozen road/low μ road determination processing at step 900, and the obstacle determination processing at step 1000, it is determined whether or not various conditions for the release priority state are satisfied, and in the response improvement intervention determination processing at step 1100, it is determined whether or not the release priority state is established based on the determination results of steps 700, 900 and 1000. Therefore, in the present embodiment, a portion that performs the processing at steps 700, 900, 1000 and 1100 corresponds to release priority state determination means of the present invention.

Then, after the response improvement intervention determination processing is complete, the processing proceeds to step 300 shown in FIG. 18 and release control determination is performed. The release control determination processing is performed using the same technique as that shown in FIG. 6 of the first embodiment.

Figure 24:
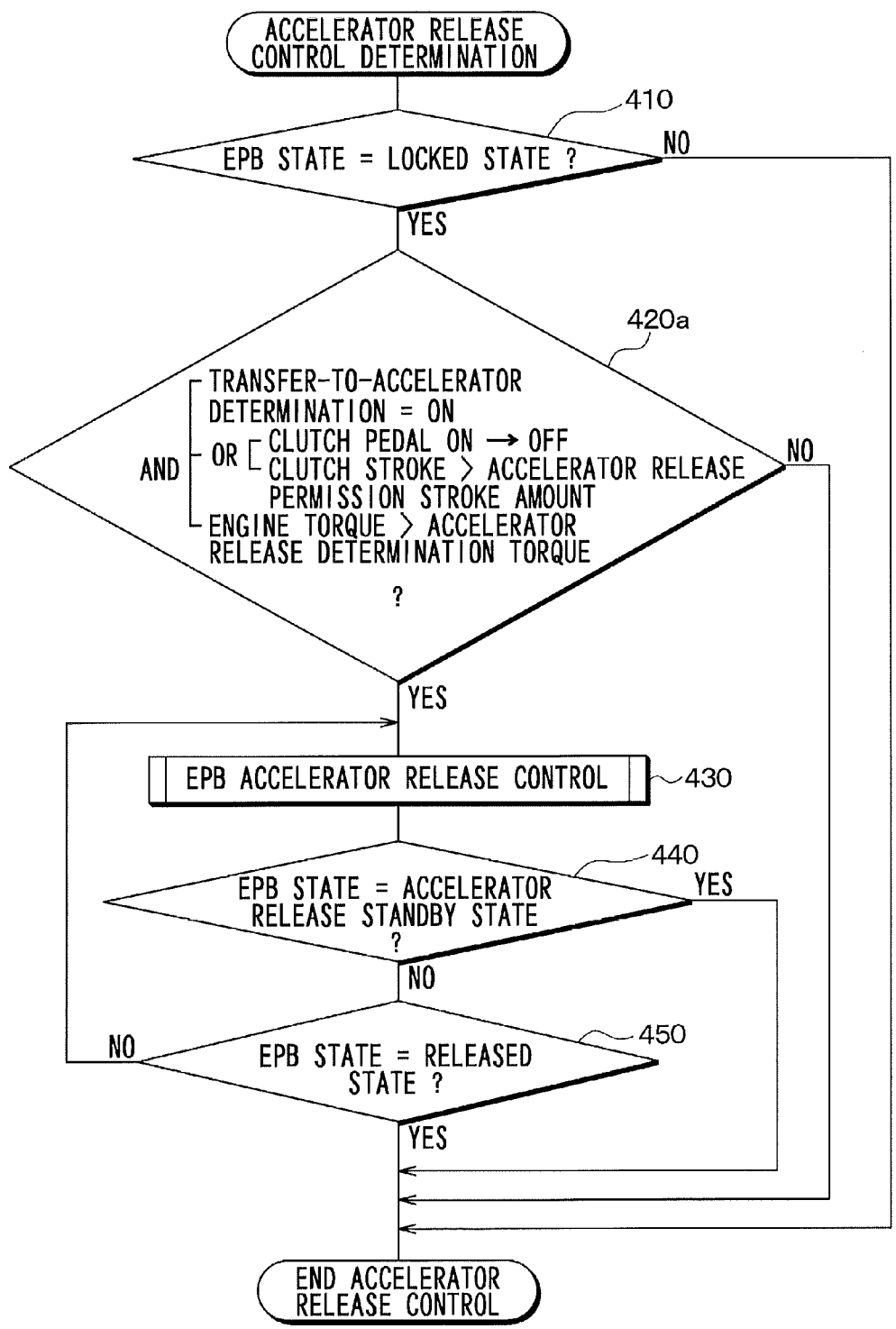
FIG. 24 is a flowchart showing, in detail, accelerator release control determination processing.

Next, after the release control determination processing is complete, the processing proceeds to step 400 and accelerator release control determination processing is performed. FIG. 24 is a flowchart showing, in detail, the accelerator release control determination processing of the present embodiment. The accelerator release control determination processing is also basically the same as that of the first embodiment. However, it differs in that processing at step 420*a* is performed instead of that at step 420 shown in FIG. 7, and in that processing at step 450 is added. In addition, the content of the EPB accelerator release control at step 430 differs.

At step 420*a*, the conditions of the processing at step 420 in FIG. 7, except the condition that the estimated gradient exceeds the accelerator release permission gradient, are used as the execution conditions for the accelerator release control, and it is determined whether or not the execution conditions are satisfied.

In the first embodiment, the accelerator release control is performed only on a slope having the accelerator release permission gradient. This is to explain that the accelerator release control is effective when it is performed on a slope, but need not necessarily be limited to the slope. For example, in the first embodiment, when the road is flat, the execution conditions for the accelerator release control are not satisfied even if other conditions are satisfied, and the accelerator release control is not automatically performed even when an accelerator operation is performed. For that reason, unless the lock is cancelled by operating the operation SW 23 for release, the release control is not performed when the accelerator is operated. However, the accelerator release control of the first embodiment may, of course, be performed on a flat road. Therefore, in the present embodiment, the conditions, except the condition that the estimated gradient exceeds the accelerator release permission gradient, are used as the execution conditions for the accelerator release control.

At step 450, it is determined whether or not the EPB state is the released state. In the present embodiment, there is no need to improve the response of the EPB 2, and when the release priority state is established, control is performed to reach not the standby position but the release position as in the related art. In this case, the EPB state is not the accelerator release standby state but the released state. Therefore, at step 450, it is determined whether or not the EPB state is the released state, and the accelerator release control is terminated even when in the released state.

Figure 25:
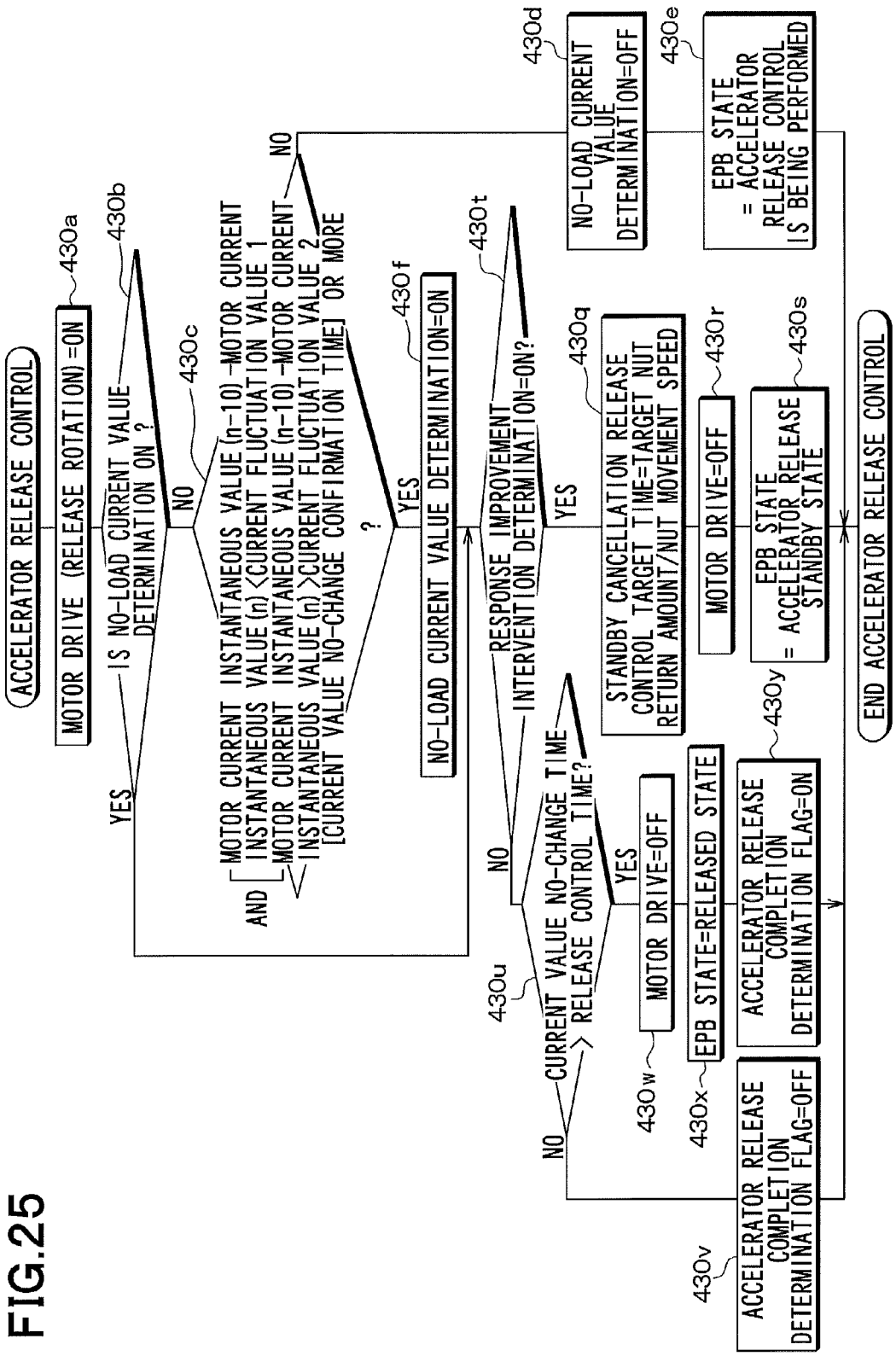
FIG. 25 is a flowchart showing, in detail, accelerator release control processing.

Accelerator release control by the EPB 2 at step 430 is different from the accelerator release control processing explained in FIG. 10 of the first embodiment in that the processing that achieves the released state is performed when there is no need to improve the response of the EPB 2 and the release priority state is established. FIG. 25 is a flowchart showing, in detail, accelerator release control processing according to the present embodiment.

At steps 430*a* to 430*f*, the same processing as that of the accelerator release control processing shown in FIG. 10 of the first embodiment is performed. Then, in the no-load current value determination at step 430*c*, if it is determined that the motor 10 is brought into a no-load state, the processing proceeds to step 430*f* and the no-load current value determination is turned on. After that, the processing proceeds to step 430*t*, and it is determined whether or not the response improvement intervention determination has been turned on. If the response improvement intervention determination has been turned on at step 1150, an affirmative determination is made here, and if it has not been turned on, a negative determination is made.

If the response improvement intervention determination has been turned on, the accelerator release standby state is established in order to improve the response. Therefore, at steps 430*q* to 430*s*, the same processing as the accelerator release control processing shown in FIG. 10 of the first embodiment is performed. As a result, the standby cancellation release control target time that is necessary to return to the release position from the accelerator release standby state is set. At the same time, the motor drive is switched off and the EPB 2 is brought into the accelerator release standby state. It is indicated that the EPB state has been changed to the accelerator release standby state.

If the response improvement intervention determination has been turned off, there is no need to improve the response and the release priority state has been established. Therefore, the control to change to the released state is performed. More specifically, at step 430*u*, it is determined whether or not a current value no-change time has exceeded a release control termination time. The current value no-change time indicates an elapsed time from when the monitored current value is changed to the no-load current value and is held constant, and corresponds to a time period after the brake pads 11 are separated from the brake disc 12. The release control termination time corresponds to a time period from when the monitored current value is changed to the no-load current value to when the propeller shaft 18 is moved to the release position, namely, a time period that is necessary for the brake pads 11 to be separated from the brake disc 12 by a predetermined distance. Therefore, until an affirmative determination is made at step 430*u*, the processing proceeds to step 430*v* and an accelerator release completion determination flag that indicates completion of the accelerator release control is turned off, thereby continuing the motor drive. Then, if an affirmative determination is made at step 430*u*, the processing proceeds to step 430*w* and the motor drive is switched off. After that, the EPB state is set to the released state at step 430*x*, and thereafter, the accelerator release completion determination flag is turned on at step 430*y* in order to indicate that the accelerator release control is complete. In this manner, the accelerator release control processing is complete.

In this manner, when it is necessary to improve the response of the EPB 2, the accelerator release standby state is established in order to improve the response. When it is not necessary to do so and the state is the release priority state, the released state is established. By doing this, it is possible to reliably avoid excessive contact of the brake pads 11 with the brake disc 12 due to variation of the standby position or the like, and it is thus possible to suppress brake noise or vibration, and further, brake dragging from occurring.

Figure 26:
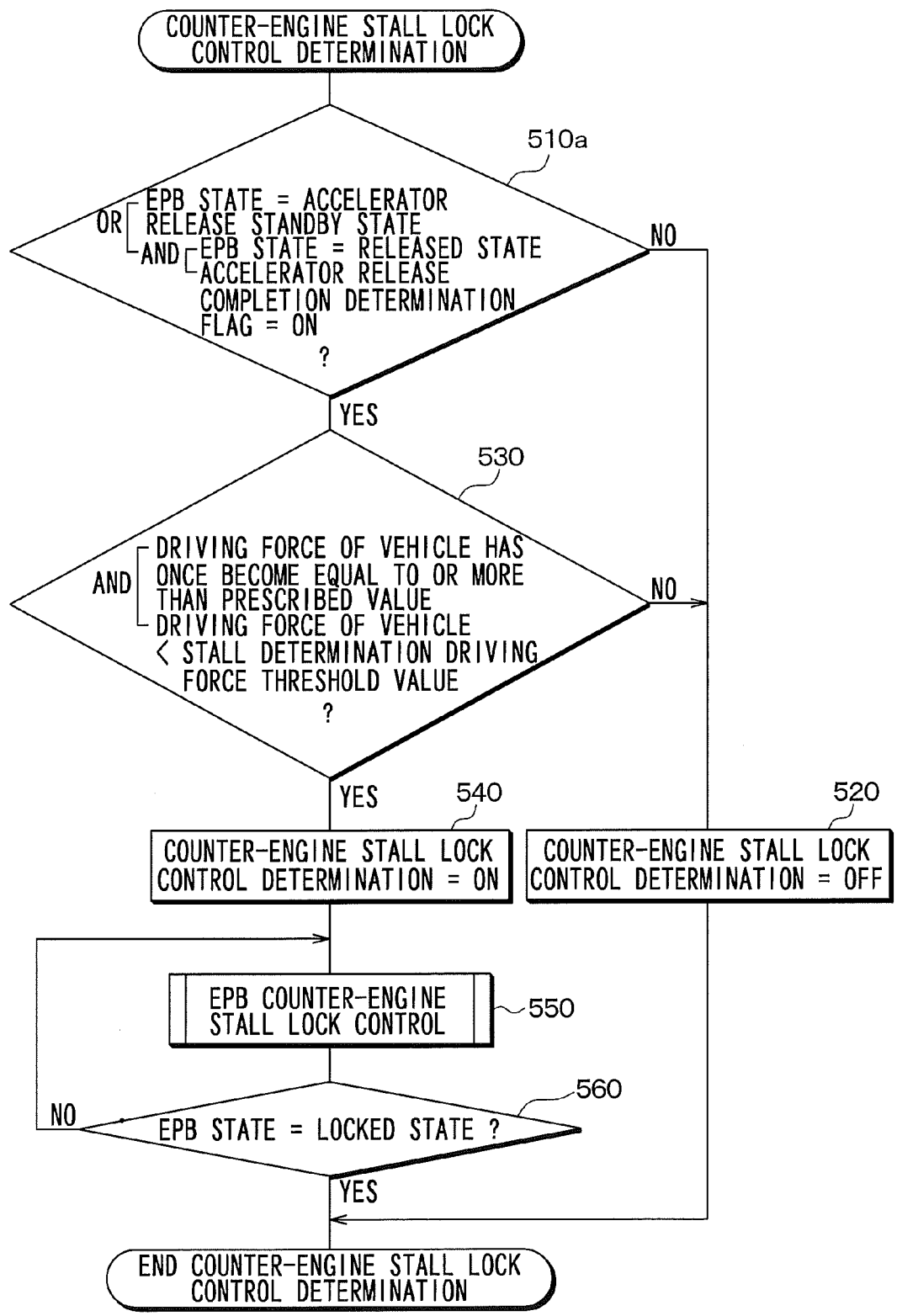
FIG. 26 is a flowchart showing, in detail, counter-engine stall lock control determination processing.

When the accelerator release control determination processing is complete in this manner, counter-engine stall lock control determination processing is performed at step 500 in FIG. 18. FIG. 26 is a flowchart showing, in detail, the counter-engine stall lock control determination processing according to the present embodiment. This processing is also basically performed using the same technique as that shown in FIG. 8 of the first embodiment. It is different only in that the processing at step 510a is performed instead of that at step 510 in FIG. 8.

In summary, in the first embodiment, basically, the accelerator release standby state is established regardless of whether or not it is necessary to improve the response of the EPB2. Therefore, in the first embodiment, at step 510 in FIG. 8, it is simply determined whether or not the EPB state is the accelerator release standby state. In contrast, in the present embodiment, when there is no need to improve the response of the EPB 2 and the state is the release priority state, the released state is established instead of the accelerator release standby state. Therefore, in the present embodiment, this state can also be recognized at step 510a. More specifically, at step 510a, it is determined whether or not one of the following conditions is satisfied: the EPB state is the accelerator release standby state; or the EPB state is the released state and the accelerator release completion determination flag is ON. Then, if one of the conditions is satisfied, the processing at step 530 onwards is performed and the counter-engine stall lock control is performed.

When the counter-engine stall lock control determination processing is complete in this manner, the standby cancellation release control determination processing is performed at step 600 in FIG. 18. This processing is also performed using the same technique as that shown in FIG. 9 of the first embodiment. In this manner, the EPB control processing according to the present embodiment is complete.

Figure 27:
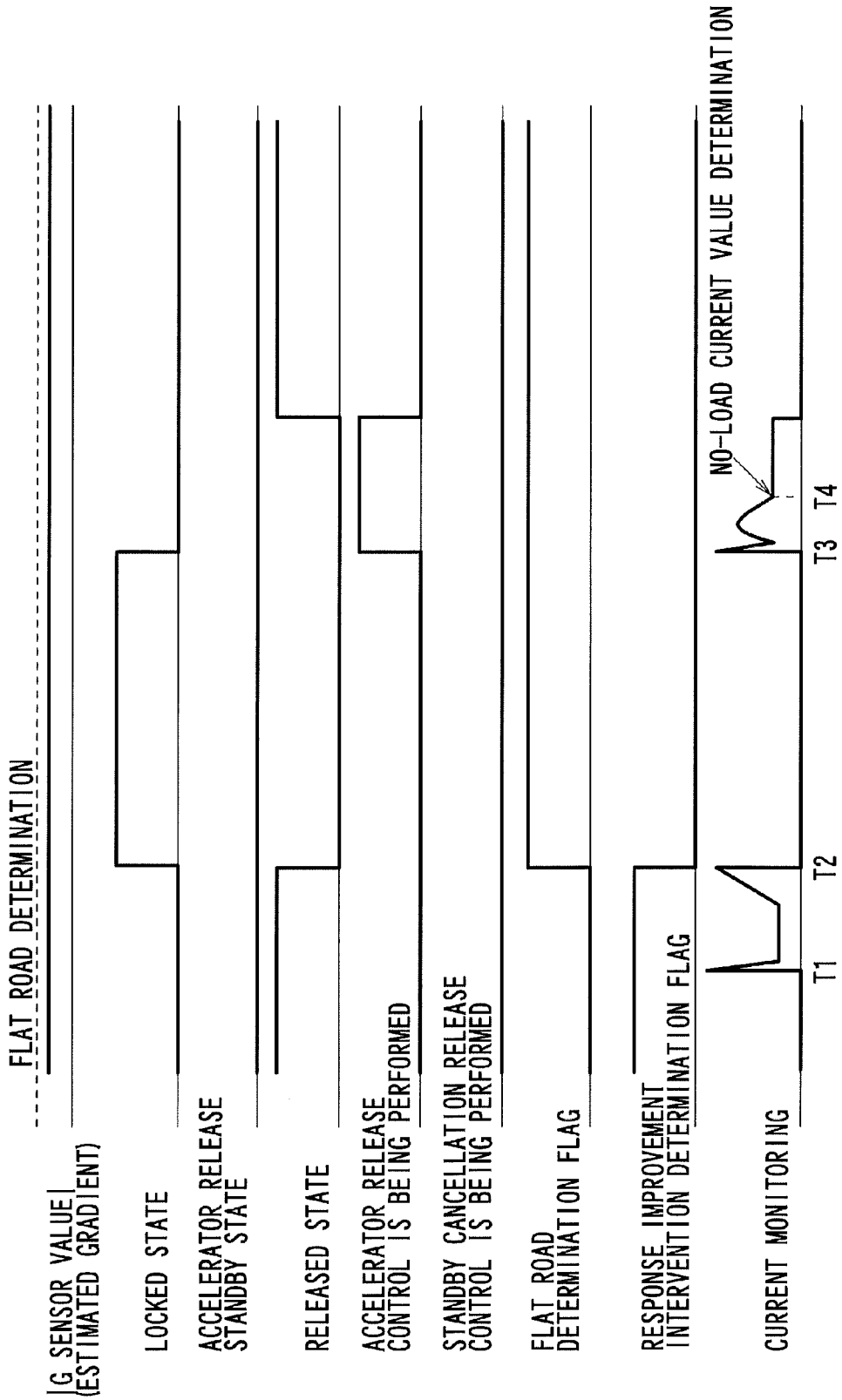
FIG. 27 is a time chart when the vehicle is on a flat road and control intervention to improve response is not performed.
Figure 28:
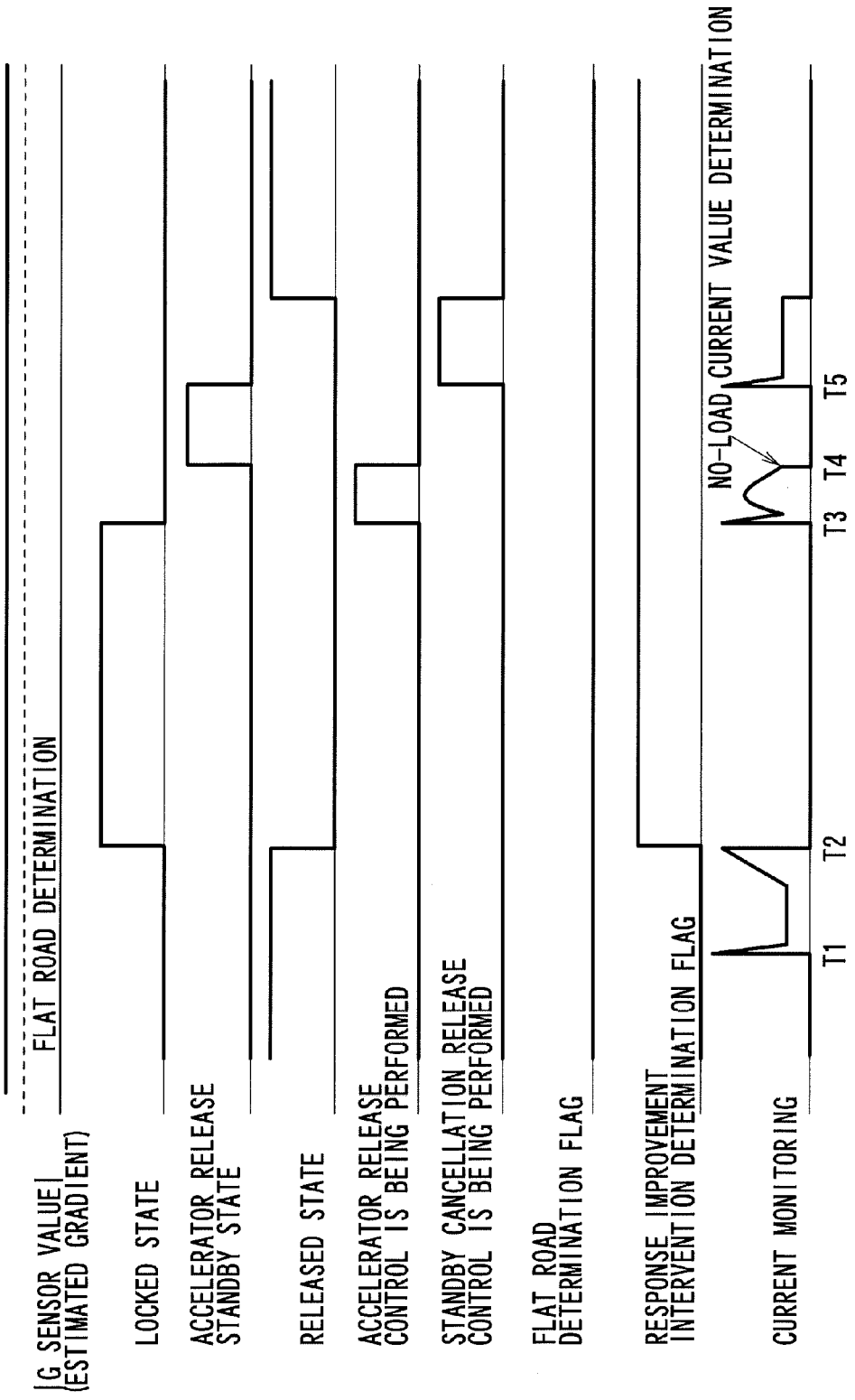
FIG. 28 is a time chart when the vehicle is on a slope and the control intervention to improve response is performed.

FIG. 27 and FIG. 28 are timing charts when the EPB control processing of the present embodiment is performed. FIG. 27 shows a case in which the vehicle is on a flat road and control intervention to improve response is not performed. FIG. 28 shows a case in which the vehicle is on a slope and the control intervention to improve response is performed.

As shown in FIG. 27, when the value of the longitudinal G sensor 25 is less than the flat road determination value, it is assumed that the gradient of the road surface on which the vehicle is stopped is less than the predetermined road surface gradient. Until the time point T1 is reached, the state before the stopping of the vehicle is shown and the released state is established. In this state, if the lock control is started, for example, by operating the operation SW 23, the lock control is performed from the time point T1. Then, after the motor current is monitored and a rush current is generated, when the monitored current value reaches the target lock current value at the time point T2, the lock control is complete and the locked state is established.

After that, when the driver intends to start moving the vehicle at the time point T3, the accelerator release control is performed simultaneously. Then, after the monitored current value of the motor current is confirmed and a rush current is generated, the no-load state is determined at the time point T4 and the no-load current value determination is turned on. At this time, since the road is flat, the response improvement intervention determination flag is OFF. Therefore, the current value no-change time is measured from when the no-load current value determination is turned on. The motor drive is continued until the current value no-change time becomes equal to the release control termination time. After that, the motor drive is stopped and the released state is established. By doing this, it is possible to reliably avoid the contact between the brake pads 11 and the brake disk 12.

As shown in FIG. 28, when the value of the longitudinal G sensor 25 is equal to or more than the flat road determination value, it is assumed that the gradient of the road surface on which the vehicle is stopped is a gradient equal to or more than the predetermined road surface gradient. Also in this case, after the locked state is established by performing the same lock control as that shown in FIG. 27 at the time points T1 and T2, if the driver intends to start moving the vehicle at the time point T3, the accelerator release control is performed simultaneously. Then, after the monitored current value of the motor current is confirmed and a rush current is generated, the no-load state is determined at the time point T4 and the no-load current value determination is turned on. At this time, since the road is a slope, the response improvement intervention determination flag is ON. Therefore, in this case, after the motor drive is continued until the movement standby time counter reaches the movement standby time threshold value, the motor drive is stopped and the accelerator release standby state is established. Thus, when an engine stall occurs, it is possible to actuate the EPB 2 with a good response and to generate a parking brake force.

When the driver starts to move the vehicle at the time point T5, the motor drive is continued from that time point until the standby cancellation release control target time is reached. After that, the motor drive is stopped and the released state is established.

As explained above, in this manner, when it is necessary to improve the response of the EPB 2, the accelerator release standby state is established in order to improve the response. On the other hand, when the state is the release priority state, the released state is established. By doing this, it is possible to reliably avoid excessive contact of the brake pads 11 with the brake disc 12 due to variation of the standby position or the like, and it is thus possible to suppress brake noise or vibration, and further, brake dragging from occurring.

(Other Embodiments)

In each of the above described embodiments, as shown in FIG. 2, the case is explained in which an integrated unit of the brake mechanisms of the service brake 1 and the EPB 2 is used as the EPB 2. However, this is simply an example, and the present invention can also be applied to a brake structure in which the service brake 1 and the EPB 2 are completely separate.

Further, in each of the above described embodiments, the disc brake type EPB 2 is used as an example. However, another type, such as a drum brake type, for example, can also be employed. In this case, brake shoes and a drum are used as the friction-applying members and the friction-applied member, respectively.

Further, in the above-described embodiments, the first or second standby position can be selected, as the setting of the standby position, in accordance with the inclination of the road surface. However, the standby position may be determined, for example, by selecting the movement standby time threshold value from a map that indicates a relationship between the inclination of the road surface and the movement standby time threshold value, in accordance with the inclination of the road surface.

Further, even when the lock control by the EPB 2 is not being performed, namely, even when the propeller shaft 18 is positioned in the release position, the control to change to the standby position described in the above-described embodiments can be performed by actuating the EPB 2 when the vehicle starts to move.

In the above-described embodiments, when there is a failure to start moving the vehicle, the EPB 2 is operated and a braking force is generated, thus preventing the rolling back of the vehicle. However, the braking force may be generated by the service brake 1. Also in this case, if the propeller shaft 18 is positioned in the standby position and the clearance between the brake pad 11 and the brake disc 12 is narrow, it is possible to shorten the time that is necessary to generate the braking force when the W/C pressure is applied by a brake operation by the driver or when the W/C pressure is applied by an automatic pressurizing function.

Further, in the above-described embodiments, a caliper-integrated parking brake, which includes the propeller shaft 18 etc. in the body 14 of the W/C 6 provided in the caliper 13, is used as an example of the EPB 2. However, the EPB 2 may be configured as a parking brake having another structure. For example, as disclosed in Japanese Patent Application Publication No. JP-A-2008-094142, a so-called drum-in-disc type parking brake may be used that includes, in a wheel hub portion of a wheel, a brake drum that is disposed on an inner diameter side of a brake disc in the disc brake, and brake shoes that come into pressure contact with an inner diameter side of the brake drum.

Note that the steps shown in each of the drawings correspond to means for performing various types of processing. More specifically, of the EPB-ECU 9, a portion that performs the processing at step 200 corresponds to lock control means, a portion that performs the processing at step 300 corresponds to release control means, a portion that performs the processing at steps 410 and 420 corresponds to accelerator release control determination means, a portion that performs the processing at step 430 corresponds to accelerator release control means, a portion that performs the processing at steps 530 and 630 corresponds to starting state determination means, a portion that performs processing at step 550 corresponds to start failure lock control means, a portion that performs the processing at step 650 corresponds to standby cancellation release control means. Further, as described above, the portion that performs the processing at steps 700, 900, 1000 and 1100 corresponds to the release priority state determination means.

REFERENCE SIGNS LIST

1 . . . Service brake
2 . . . EPB
5 . . . M/C
6 . . . W/C
7 . . . ESC actuator
8 . . . ESC-ECU
9 . . . EPB-ECU
10 . . . Motor
11 . . . Brake pad
12 . . . Brake disc
18 . . . Propeller shaft
18a . . . Female screw groove
19 . . . Piston
23 . . . Operation SW
24 . . . Lock/release display lamp
25 . . . Longitudinal G sensor
26 . . . Pedal stroke sensor
27 . . . Engine ECU

The invention claimed is:

1. An electric parking brake control device that controls an electric actuator that drives an electric parking brake, wherein
the electric parking brake control device performs control to reach a lock position, a release position and a standby position between the lock position and the release position, wherein:
in the lock position, the electric actuator is actuated, a friction-applying member is thereby pressed against a friction-applied member by the electric parking brake by actuating the electric actuator, and a predetermined braking force is generated;
in the release position, the friction-applying member is separated from the friction-applied member when the electric parking brake is not actuated; and
in the standby position, a transition to the lock position is performed in a shorter time than when the electric parking brake is actuated from the release position by the actuation of the electric actuator,
the electric parking brake control device controls, when a starting operation to start moving a vehicle is performed, the electric actuator such that the standby position is reached,
the electric actuator generates a brake force by causing a nut to come in contact with a piston such that the friction-applying member is pressed against the friction-applied member, and
the standby position is a position at which a brake force of the electric parking brake is not generated, and a clearance between the piston and the nut at the standby position is smaller than a clearance between the piston and the nut at the release position.

2. The electric parking brake control device according to claim 1, wherein
accelerator release control for controlling the electric actuator to reach the standby position is performed when the starting operation is performed while in lock control or in a locked state, wherein
the lock control is such that the actuator is controlled toward the lock position and that the lock position is to be held after the lock position is reached, and
the lock state is such that the lock position is continued to be held.

3. The electric parking brake control device according to claim 2, further comprising:
release priority state determination means for determining whether a release priority state, in which priority is given to movement to the release position, is established, wherein
the accelerator release control is not performed when in the release priority state, the accelerator release control controlling the electric actuator such that the standby position is reached when it is determined that the starting operation is performed.

4. The electric parking brake control device according to claim 3, wherein
the electric parking brake control device is configured to determine whether the vehicle is traveling on a flat road, and
when it is determined that the vehicle is traveling on a flat road, the release priority state determination means determines that the release priority state is established.

5. The electric parking brake control device according to claim 3, wherein
the electric parking brake control device is configured to determine whether the vehicle is on a road whose road surface friction coefficient p is lower than a predetermined threshold value, and
when the vehicle is determined to be on a road whose road surface friction coefficient p is lower than the predetermined threshold value, the release priority state determination means determines that the release priority state is established.

6. The electric parking brake control device according to claim 3, herein
the release priority state determination means has obstacle detection means for detecting an obstacle in the vicinity of the vehicle, and determines that the release priority state is established when a distance between the vehicle and the detected obstacle is equal to or more than a predetermined distance.

7. The electric parking brake control device according to claim 1, wherein
the electric parking brake control device is configured to determine whether normal starting is performed or start failure occurs, wherein the normal starting is such that a transition to traveling is performed after the vehicle is started by the starting operation, and the start failure is such that the transition to traveling cannot be performed, and
when it is determined that the normal starting is performed, the electric actuator is controlled such that the release position is reached, and when it is determined that the start failure occurs, the electric actuator is controlled such that the lock position is reached.

8. The electric parking brake control device according to claim 1, comprising:
lock control means for performing the lock control;
release control means for controlling the electric actuator such that the release position is reached;
starting state determination means for determining whether the normal starting is performed;
accelerator release control determination means for determining whether the starting operation is performed when the lock control is being performed or when in the locked state;
accelerator release control means for controlling the electric actuator such that the standby position is reached when the accelerator release control determination means determines that the starting operation is performed;
standby cancellation release control means for controlling the electric actuator such that the release position is reached from the standby position when the starting state determination means determines that the normal starting is performed; and
start failure lock control means for controlling the electric actuator such that the lock position is reached when the starting state determination means determines that the start failure has occurred.

9. An electric parking brake control device comprising;
lock control means for performing normal lock control in which a propeller shaft is moved in one direction by driving a motor to rotate in a positive direction and a parking brake force by an electric parking brake is generated by moving a friction-applying member in a direction toward a friction-applied member attached to a wheel in accordance with the movement of the propeller shaft, and after generating the parking brake force, the wheel is brought into a locked state by stopping the drive of the motor and holding the parking brake force, and
release control means for performing release control in which the propeller shaft is moved in a direction opposite to the one direction by driving the motor to rotate in a reverse direction and the parking brake force by the electric parking brake is reduced by moving the friction-applying member in a direction away from the friction-applied member in accordance with the movement of the propeller shaft, and after reducing the parking brake force, the wheel is brought into a released state by stopping the drive of the motor and releasing the parking brake force,
the electric parking brake control device further comprising:
starting state determination means for determining that normal starting is performed when a transition to traveling is performed after a vehicle has started moving, and for determining that a start failure occurs when the transition to traveling cannot be performed;
accelerator release control determination means for determining whether a starting operation is performed when the lock control is being performed or when in the locked state;
accelerator release control means for moving the propeller shaft to a standby position when the accelerator release control determination means determines that the starting operation is performed, the standby position being between a lock position where the locked state is established and a release position where the released state is established;
standby cancellation release control means for performing the release control and moving the propeller shaft from the standby position to the release position when the starting state determination means determines that the normal starting is performed; and
start failure lock control means for performing start failure lock control when the starting state determination means determines that the start failure has occurred, and for generating a parking brake force by causing the propeller shaft to move in the one direction by driving the motor to rotate in the positive direction, wherein
the electric actuator generates a brake force by causing the propeller shaft to come in contact with a piston such that the friction-applying member is pressed against the friction-applied member, and
the standby position is a position at which a brake force of the electric parking brake is not generated, and a clearance between the piston and the propeller shaft at the standby position is smaller than a clearance between the piston and the propeller shaft at the release position.

10. The electric parking brake control device according to claims 9, wherein
the starting state determination means determines that there is the start failure when a driving force of the vehicle is less than a driving threshold value.

11. The electric parking brake control device according to claim 9, wherein
the starting state determination means determines that there is the start failure when a clutch operation amount of the vehicle is equal to or less than a reference value.

12. The electric parking brake control device according to claim 9, wherein
the starting state determination means determines that the normal starting is performed when a speed of the vehicle exceeds a certain value.

13. The electric parking brake control device according to claim 9, wherein
the accelerator release control means determines whether a condition under which there is a possibility of an engine stall of the vehicle is satisfied, and performs the accelerator release control when the condition is satisfied.

14. The electric parking brake control device according to claim 9, wherein
the start failure lock control means performs the start failure lock control and thereby generates a parking brake force that is larger than that generated by the normal lock control.

15. The electric parking brake control device according to claim 9, wherein
the electric parking brake generates a parking brake force by causing the propeller shaft to move in the one direction and also causing the piston to move in the same direction such that the friction-applying member is pressed against the friction-applied member, and the piston generates a service brake force by pressing the friction-applying member against the friction-applied member also based on a brake fluid pressure generated by an operation of a service brake, and
the accelerator release control means causes the propeller shaft to move to a first standby position, as the standby position, in which a clearance exists between the piston and the propeller shaft.

16. The electric parking brake control device according to claim 9, wherein
the electric parking brake generates a parking brake force by causing the propeller shaft to move in the one direction and also causing the piston to move in the same direction such that the friction-applying member is pressed against the friction-applied member, and the piston generates a service brake force by pressing the friction-applying member against the friction-applied member also based on a brake fluid pressure generated by an operation of a service brake, and
the accelerator release control means causes the propeller shaft to move to a second standby position, as the standby position, in which the propeller shaft is in contact with the piston and the piston has been moved in the one direction from an initial position when in the released state.

17. The electric parking brake control device according to claim 9, wherein
the electric parking brake generates a parking brake force by causing the propeller shaft to move in the one direction and also causing the piston to move in the same direction such that the friction-applying member is pressed against the friction-applied member, and the piston generates a service brake force by pressing the friction-applying member against the friction-applied member also based on a brake fluid pressure generated by an operation of a service brake,
the accelerator release control means is adapted to cause the propeller shaft to move by selecting, as the standby position, one of a first standby position in which a clearance exists between the piston and the propeller shaft and a second standby position in which the propeller shaft is in contact with the piston and the piston has been moved in the one direction from an initial position when in the released state, and
the first standby position is selected when an inclination of a road surface on which the vehicle is stopped is equal to or less than a predetermined threshold value, and the second standby position is selected when the inclination exceeds the threshold value.

\* \* \* \* \*